United States Patent
Johnston et al.

(10) Patent No.: US 11,514,412 B2
(45) Date of Patent: Nov. 29, 2022

(54) SYSTEMS AND METHODS FOR REAL TIME DATA RICH CROSS BORDER PAYMENT TRANSACTIONS

(71) Applicant: MASTERCARD INTERNATIONAL INCORPORATED, Purchase, NY (US)

(72) Inventors: Ainsley Johnston, Toronto (CA); Daniel Carbone, Toronto (CA); Ramesh Jayakrishnan, Milton (CA); Suvetha Sivakumar, Brampton (CA); Rohan Mazumdar, Washington, DC (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 146 days.

(21) Appl. No.: 16/717,855

(22) Filed: Dec. 17, 2019

(65) Prior Publication Data
US 2021/0182810 A1 Jun. 17, 2021

(51) Int. Cl.
*G06Q 20/08* (2012.01)
*G06Q 20/02* (2012.01)

(52) U.S. Cl.
CPC ......... *G06Q 20/085* (2013.01); *G06Q 20/023* (2013.01)

(58) Field of Classification Search
CPC .................... G06Q 20/085; G06Q 20/023
See application file for complete search history.

(56) References Cited

U.S. PATENT DOCUMENTS

| | | |
|---|---|---|
| 8,533,119 B2 | 9/2013 | Pasha et al. |
| 2002/0029193 A1* | 3/2002 | Ranjan .............. G06Q 20/12 705/38 |
| 2005/0004872 A1* | 1/2005 | Gavin .............. G06Q 40/02 705/42 |
| 2005/0222961 A1 | 10/2005 | Staib et al. |

(Continued)

OTHER PUBLICATIONS

"ISO 20022: Cross-Border Payments Usage Guidelines Revealed," https://www.cashbook.com/iso-20022-cross-border-payments-usage-guidelines-revealed/ (Dec. 5, 2019). (Year: 2019).*

*Primary Examiner* — Elizabeth H Rosen
(74) *Attorney, Agent, or Firm* — Armstrong Teasdale LLP

(57) ABSTRACT

A cross border payment (CBP) computing device for transmitting cross border data rich payments in real-time is provided. The CBP computing device receives, from an originating bank associated with a payor, a payment request message to transfer funds in real-time. The payment request message includes payment instructions and transaction information associated with a transfer amount. The CBP computing device determines that the payment request message is a cross border payment transfer from a first payment network for processing real-time payments within a first country to a second payment network for processing real-time payments within a second country, and retrieves, from a database, a set of rules based on a payment messaging standard and protocol associated with the second payment network. The CBP computing device reformats the payment request messaged based on the retrieved set of rules, and transmits the reformatted payment message to a receiving bank associated with a payee.

17 Claims, 15 Drawing Sheets

(56) References Cited

U.S. PATENT DOCUMENTS

| | | | |
|---|---|---|---|
| 2006/0253339 A1* | 11/2006 | Singh | G06Q 30/0613 |
| | | | 705/26.41 |
| 2008/0059350 A1* | 3/2008 | Raymond | G06Q 30/00 |
| | | | 705/35 |
| 2010/0280949 A1 | 11/2010 | Van Rensburg | |
| 2011/0055077 A1 | 3/2011 | French et al. | |
| 2014/0222599 A1* | 8/2014 | Wang | H04L 51/222 |
| | | | 705/39 |
| 2015/0046331 A1 | 2/2015 | Gupta et al. | |
| 2015/0095225 A1* | 4/2015 | Appana | G06Q 20/3674 |
| | | | 705/41 |
| 2017/0178098 A1* | 6/2017 | Hu | G06Q 40/02 |
| 2017/0221066 A1 | 8/2017 | Ledford et al. | |
| 2017/0286984 A1 | 10/2017 | Berger et al. | |
| 2017/0316394 A1 | 11/2017 | Zhu | |
| 2017/0357955 A1* | 12/2017 | Parekh | G06Q 20/10 |
| 2018/0121891 A1* | 5/2018 | Hosny | G06Q 20/4016 |
| 2018/0182002 A1* | 6/2018 | Simpson | G06Q 20/02 |
| 2018/0276658 A1* | 9/2018 | Liscia | G06Q 20/102 |
| 2018/0308070 A1* | 10/2018 | Raina | G06Q 20/10 |
| 2019/0213679 A1 | 7/2019 | R. et al. | |
| 2019/0220853 A1* | 7/2019 | Srinivasan | G06Q 20/10 |

\* cited by examiner

SYSTEMS AND METHODS FOR REAL TIME DATA RICH CROSS BORDER PAYMENT TRANSACTIONS

BACKGROUND

This disclosure relates generally to processing electronic messages over a payment network, and more specifically to transmitting cross border payments using data rich messaging in real-time from a payor associated with a first payment processing network to a payee associated with a second payment processing network.

In today's world, more and more electronic payment processing systems are transitioning toward faster processing of electronic fund transfer transactions. Many financial institutions offer domestic funds transfer schemes, such as domestic bank wire transfers that can take anywhere from a couple of hours to several days to process. Known domestic funds transfer schemes, for example in the United States, include same day transaction schemes that leverage the Automated Clearing House (ACH) payment processing network as well as real-time transaction schemes that leverage The Clearing House (TCH) payment processing network to move funds within the U.S. market. However, these known domestic schemes do not extend to real-time cross border payments made from a payor's financial account to a payee's financial account or allow for the payor and payee to be able to communicate additional data regarding each payment in real-time.

Known cross border payment schemes include international bank wire transfers, such as funds transfers made through the Society for Worldwide Interbank Financial Telecommunication (SWIFT) network. These cross border payment schemes generally take several days to process and release funds to recipients. Further, with some known cross border payment schemes, it is difficult to identify and address processing errors and delays that occur while the electronic funds transfer is being processed. In these situations, the recipient, usually after waiting for an extended period of time, has to reach out to their financial institution and/or to the sender to investigate as to why they have not received their electronic funds transfer. In situations where multiple correspondent banks and various domestic payment processing networks are involved, not only may the processing speed be slow, but the payment trail may be complicated, thereby making it even more difficult to investigate payment delays due to processing errors that occur at different points along the payment trail. For example, a cross border payment made through the SWIFT network may result in a delayed (or no) payment to the recipient due to processing errors and/or delays caused by one or more correspondent banks in the sender's country and/or the recipient's country. Thus, there exists a need for a cross border payment scheme that enables a payor of one country to easily make and track real-time payments to a payee of another country.

BRIEF DESCRIPTION OF THE DISCLOSURE

In one aspect, a cross border payment (CBP) computing device for transmitting cross border data rich payments in real-time from a payor associated with a first payment processing network for processing real-time payments within a first country to a payee associated with a second payment processing network for processing real-time payments within a second country may be provided. The CBP computing device may be in communication with both the first payment processing network and the second payment processing network. The CBP computing device may include a processor communicatively coupled to a memory. The processor may be programmed to receive a payment request message to transfer funds in real-time from a payor account associated with the payor to a payee account associated with the payee. The payment request message may be received from an originating bank associated with the payor. The payment request message may include payment instructions and transaction information associated with a transfer amount. The payment instructions may include a payor identifier and a payee identifier. The processor may be further programmed to determine that the payment request message is a cross border payment transfer from the first payment processing network to the second payment processing network. The first payment processing network and the second payment processing network utilize different messaging protocols. The processor may also be programmed to retrieve, from a database, a set of rules to apply to the received payment request message. The set of rules may be based on a payment messaging standard and protocol associated with the second payment network. The processor may further be programmed to reformat the received payment request message to comply with the payment messaging standard and protocol of the second payment network based on the retrieved set of rules. The processor may also be programmed to transmit the reformatted payment message to a receiving bank associated with the payee to cause the receiving bank to automatically disburse funds equal to the transfer amount into the payee account.

In another aspect, a computer-implemented method for transmitting cross border data rich payments in real-time from a payor of a first country to a payee of a second country is provided. The method may be implemented using a cross border payment (CBP) computing device in communication with a first payment processing network for processing real-time payments within a first country and a second payment processing network for processing real-time payments within a second country. The CBP computing device may include a processor communicatively coupled to a memory. The method includes receiving, by the processor, a payment request message to transfer funds in real-time from a payor account associated with the payor to a payee account associated with the payee. The payment request message may be received from an originating bank associated with the payor. The payment request message may include payment instructions and transaction information associated with a transfer amount. The payment instructions may include a payor identifier and a payee identifier. The method also includes determining that the payment request message is a cross border payment transfer from the first payment processing network of the first country to the second payment processing network of the second country. The first payment processing network and the second payment processing network utilize different messaging protocols. The method further includes retrieving, by the processor, a set of rules from a database to apply to the received payment request message. The set of rules may be based on a payment messaging standard and protocol associated with the second payment network of the second country. The method further includes reformatting, by the processor, the received payment request message to comply with the payment messaging standard and protocol of the second payment network based on the retrieved set of rules. The method also includes transmitting, by the processor, the reformatted payment message to a receiving bank associated with the payee to cause the receiving bank to automatically disburse funds equal to the transfer amount into the payee account.

In yet another aspect, a non-transitory computer-readable storage media having computer-executable instructions for transmitting real-time cross border data rich payments from a payor of a first country to a payee of a second country embodied thereon is provided. When executed by a cross border payment (CBP) computing device in communication with a first payment processing network for processing real-time payments within a first country and a second payment processing network for processing real-time payments within a second country, the CBP computing device comprising a processor communicatively coupled to a memory, the computer-executable instructions cause the CBP computing device to receive a payment request message to transfer funds in real-time from a payor account associated with the payor to a payee account associated with the payee. The payment request message may be received from an originating bank associated with the payor. The payment request message may include payment instructions and transaction information associated with a transfer amount. The payment instructions may include a payor identifier and a payee identifier. The computer-executable instructions further cause the CBP computing device to determine that the payment request message is a cross border payment transfer from the first payment processing network of the first country to the second payment processing network of the second country. The first payment processing network and the second payment processing network utilize different messaging protocols. The computer-executable instructions further cause the CBP computing device to retrieve, from a database, a set of rules to apply to the received payment request message. The set of rules may be based on a payment messaging standard and protocol associated with the second payment network of the second country. The computer-executable instructions further cause the CBP computing device to reformat the received payment request message to comply with the payment messaging standard and protocol of the second payment network based on the retrieved set of rules. The computer-executable instructions further cause the CBP computing device to transmit the reformatted payment message to a receiving bank associated with the payee to cause the receiving bank to automatically disburse funds equal to the transfer amount into the payee account.

BRIEF DESCRIPTION OF THE DRAWINGS

FIG. 1 is an example flow diagram illustrating a real-time cross border payment process using a cross border payment (CBP) processing system that includes a cross border payment (CBP) computing device.

FIG. 2 is an example flow diagram illustrating the flow of data between various components of the cross border payment (CBP) processing system shown in FIG. 1.

FIG. 3 is an example environment of a simplified block diagram of the CBP computing device for processing real-time cross border payment transactions.

FIG. 4 is an example configuration of a client computer device for use in the system shown in FIG. 1.

FIG. 5 is an example configuration of a server computer device for use in the system shown in FIG. 1.

FIG. 6 is a flow chart of an example process for transmitting real-time cross border payments using the CBP computing device shown in FIG. 1.

FIG. 7 is a diagram of components of one or more example computing devices that may be used in the CBP processing system shown in FIG. 1.

FIGS. 8-15 are example screenshots of a user interface of a user computing device associated with a payor for transmitting real-time cross border data rich payments in accordance with the process shown in FIG. 6 and the CBP processing system shown in FIG. 1.

Figure 1:
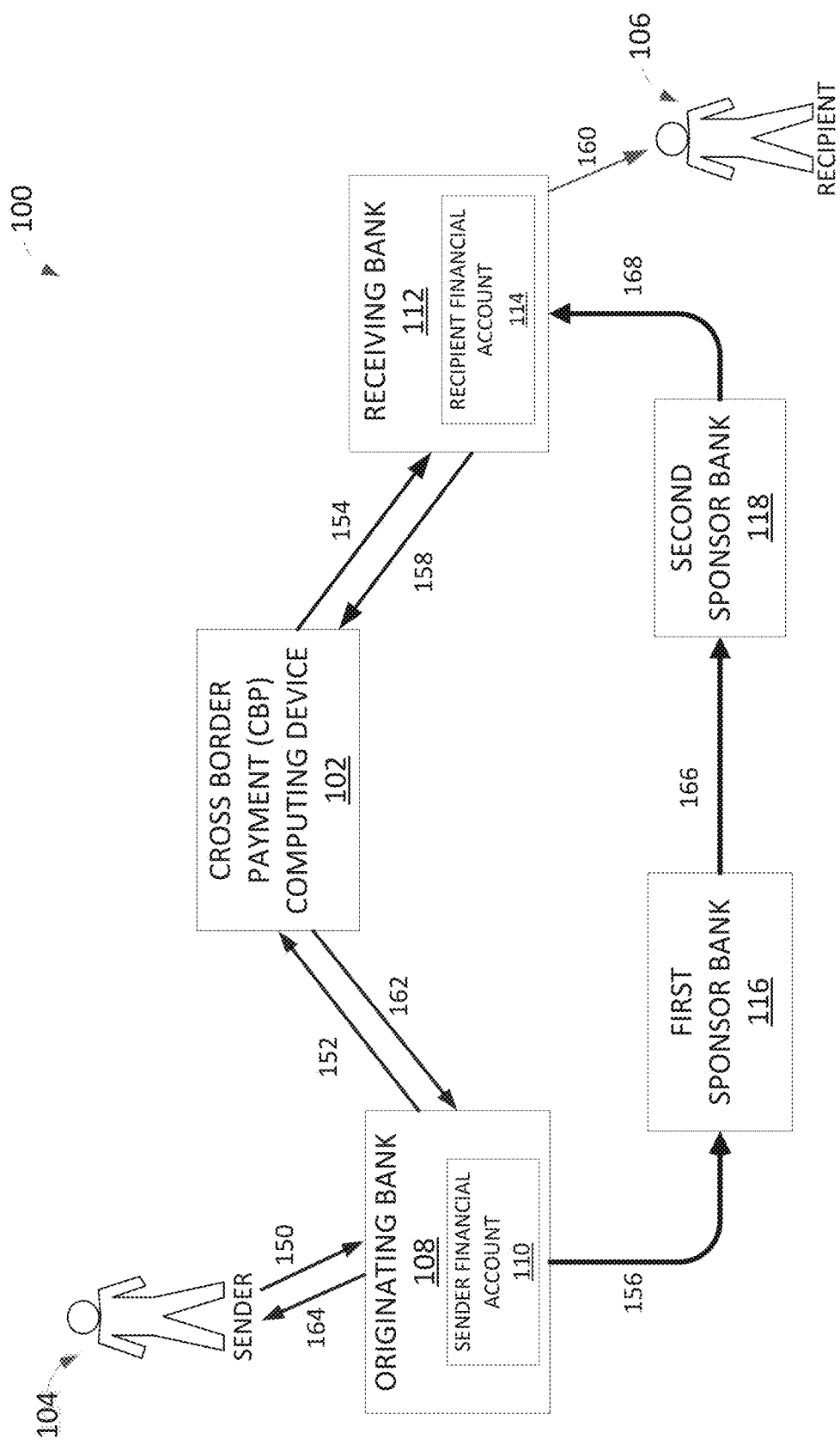
FIGS. 1-15 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The systems and methods according to this disclosure are directed to transmitting, in real-time, cross border payments from a payor to a payee using a cross border payment (CBP) processing system that includes a cross border payment (CBP) computing device. The payor may be associated with a first payment processing network and the payee may be associated with a second payment processing network. The first payment processing network is different from the second payment processing network. The first payment network (e.g., payment processing network) may be, for example, a real-time payment processing network that is geographically located within a single country (e.g., domestic). Similarly, the second payment network may be, for example, a real-time payment processing network that is geographically located within another country. The first and second payment networks are not capable of conducting a cross-border transaction by themselves, as the first and second payment networks have different communication protocols.

More specifically, the CBP computing device is in communication with both the first payment processing network and the second payment processing network. The CBP computing device includes a processor communicatively coupled to a memory, and is configured to receive a payment request message to transfer funds in real-time from a payor account associated with the payor to a payee account associated with the payee. The CBP computing device receives the payment request message from an originating bank associated with the payor. The payment request message includes payment instructions and transaction information associated with a transfer amount. The payment instructions include a payor identifier and a payee identifier. The CBP computing device is further configured to determine that the payment request message is a cross border payment transfer from the first payment processing network to the second payment processing network. The CBP computing device is also configured to retrieve, from a database, a set of rules to apply to the received payment request message. The set of rules are based on a payment messaging standard and protocol associated with the second payment network. The CBP computing device is still further configured to reformat the received payment request message to comply with the payment messaging standard and protocol of the second payment network based on the retrieved set of rules. The CBP computing device is also configured to transmit the reformatted payment message to a receiving bank associated with the payee to cause the receiving bank to automatically disburse funds equal to the transfer amount into the payee account.

In the example embodiment, a payment sender (e.g., payor) initiates a payment transfer by providing a funds transfer message (e.g., a payment request message) to a financial institution associated with the sender, such as an originating bank. In the example embodiment, a financial account associated with the sender is maintained at the originating bank. In some embodiments, the sender may have multiple financial accounts at the originating bank. For example, the sender may have a checking account and a savings account at the originating bank. In the example embodiment, the funds transfer message includes payment instructions for transferring funds from the sender's selected financial account to a financial account associated with the recipient.

The recipient's financial account may be maintained at a financial institution associated with the recipient, such as a receiving bank. The recipient's financial account is any type of financial account capable of receiving funds as described herein, for example, through a real-time transaction over a domestic real time rail (RTR) (e.g., real-time payment processing network). In addition, the payment instructions include a sender identifier (e.g., payor identifier) and a transfer amount. The payment instructions may further include, for example, a recipient identifier (e.g., payee identifier) associated with the recipient's financial account. The recipient identifier may be an alphanumeric identifier associated with the recipient's financial account and/or any information associated with the recipient and/or the recipient's financial account. For example, in some embodiments, the CBP computing device may prompt the sender to provide a name, home address, and financial account number associated with the recipient. Additionally or alternatively, the CBP computing device may prompt the sender to provide a routing number associated with the recipient's financial account. In other embodiments, a registered proxy may be associated with the recipient. In these embodiments, the CBP computing device may prompt the sender to provide an alias associated with the recipient, such as a recipient identifier (e.g., user ID), phone number, and/or an email address associated with the recipient's financial account.

In further embodiments, the payment instructions may also include information as to the country from where funds are being transferred (e.g., the country where the sender's financial account is located) and/or information as to the country where the funds are being received (e.g., the country where the recipient's financial institution is located). For example, the funds transfer message may include country codes associated with the sender's country (e.g., first country) and the recipient's country (e.g., second country).

In the example embodiment, in addition to payment instructions, the funds transfer message may also include transaction data (e.g., transaction information) associated with the funds transfer transaction. The CBP computing device enables the sender to send transaction details (e.g., remittance information) to the recipient in regards to the transfer amount. For example, the sender may be a customer in the United States who purchased $300 USD of goods from an online merchant (e.g., the recipient) located in Canada. In this example, the sender may elect to transmit transaction information (e.g., remittance information) along with the transfer amount (e.g., "this amount is for the goods purchased on X date"). Additionally or alternatively, the CBP computing device enables the sender to send an invoice (e.g., as an attachment) to the recipient as part of the funds transfer transaction. In further embodiments, the recipient may send an invoice to the sender, requesting a funds transfer. The transaction data may include a transaction and/or invoice number associated with a purchase transaction between the sender and recipient. Additionally or alternatively, the transaction data may include details in regard to the payment being sent (e.g., "this is X amount (in USD) for hotel reservation number XYZ made on YY date"). The transaction data may further include details as to the amount to be transferred (e.g., a transfer amount), the exchange rate for the transaction as of the date of the transaction, and the transfer amount converted to the foreign currency (e.g., foreign currency amount). In further embodiments, the remittance information may also include payment terms between the sender and recipient and/or a payment record associated with the transaction between the sender and recipient (e.g., a record of a balance owed, an amount paid, and an amount remaining).

The funds transfer message may be transmitted to the sender's bank (e.g., originating bank) from the sender (e.g., via a user computing device associated with the sender) via a specific software application (app) associated with the CBP computing device. In the example embodiment, the sender transmits a funds transfer message to the originating bank via a banking application (e.g., banking app) associated with the originating bank.

In the example embodiment, the originating bank initiates an authentication process after receiving the funds transfer message. The originating bank may implement authentication tasks to verify that the sender is an authorized accountholder of the financial account from which funds (in the transfer amount) are to be withdrawn. Additionally or alternatively, the originating bank may check the balance of sender's financial account to verify that sufficient funds are available for the funds transfer transaction. In the example embodiment, the originating bank authorizes (e.g., approves) the payment in real-time or near real-time upon receiving the funds transfer message from the sender.

In the example embodiment, the originating bank subsequently transmits the received funds transfer message to the CBP computing device for real-time (or near real-time) clearing. "Clearing" refers to the communication of financial data for reconciliation purposes between the parties (e.g., between the originating bank and receiving bank). "Real-time" refers to outcomes occurring within a substantially short period after an input (e.g., from about milliseconds to minutes, or hours, as opposed to a matter of days). The time period is a result of the capability of the CBP computing device and/or one or more payment processing networks implementing processing of the inputs to generate the outcome. Events occurring in real-time occur without substantial intentional delay. In the example embodiment, the funds transfer message is transmitted via a domestic real time rail (RTR) payment network. The CBP computing device recognizes the received funds transfer message as a cross border transfer transaction from the sender's country to the recipient's country.

The CBP computing device may validate the data of the received funds transfer message. The CBP computing device may parse data associated with the first country and the second country from the received funds transfer message, and determine that funds are to be transmitted in real-time from the first country to the second country. For example, in some embodiments, the CBP computing device may parse country identifiers from the received funds transfer message. In particular, the CBP computing device may use the parsed data to determine that the funds transfer message was received via a first payment network associated with the first country. For example, the CBP computing device may recognize that the sender's country is the United States (U.S.), and that the funds transfer message was transmitted by the sender's bank via a U.S. real-time rail (RTR), such as The Clearing House (TCH) Real-Time Payments (RTP) system. In another example, the CBP computing device may detect that the funds transfer message was transmitted by the sender's bank to the CBP computing device via the Automated Clearing House (ACH) payment network.

In further embodiments, the CBP computing device may retrieve payment communication data associated with the second country. For example, the retrieved payment communication data may include data as to a type (or types) of payment processing networks used in the second country, and the payment message formatting standards and protocols associated with each type of payment processing network. Using the retrieved information, the CBP computing device may determine that the funds transfer message needs to be transmitted by the CBP computing device to the recipient's bank (e.g., receiving bank) via a second payment network associated with the second country. In the example embodiment, the CBP computing device is able to determine that (i) the received funds transfer message was received in a format in accordance with the first payment network of the first country, (ii) a second payment network used in the second country can be utilized by the CBP computing device to transmit the received funds transfer message to the receiving bank, (iii) the format of the received funds transfer message is different from the format required by the second payment network, and accordingly, (iv) the received funds transfer message needs to be reformatted to comply with the payment messaging standard and protocol of the second payment network.

For example, the CBP computing device may receive a funds transfer message that includes payment instructions to move funds in a transfer amount from the sender's financial account in the U.S. to the recipient's financial account in Singapore. The CBP computing device may determine that a funds transfer message received from the sender's bank (e.g., originating bank) via the TCH (e.g., a real-time domestic payment processing network) needs to be reformatted to comply with an electronic payment network of Singapore, such as Singapore's RTR FAST (Fast And Secure Transfers) payment network (e.g., a real-time domestic payment processing network). In further embodiments, the CBP computing device may screen the received funds transfer messages to determine whether the receiving bank is capable of processing the funds transfer transaction in real-time. For example, the CBP computing device may verify whether the receiving bank has the infrastructure to receive messages from the CBP computing device in real-time. In this example, if the receiving bank is not connected to a RTR payment network, the CBP computing device may transmit a notification message back to the originating bank to notify the originating bank that the receiving bank is not capable of processing a funds transfer transaction in real-time (e.g., rather, the funds transfer transaction may take a couple days to process). In this example, the notification message may further ask the originating bank if the sender would still like to proceed with the funds transfer transaction.

In the example embodiment, the CBP computing device retrieves, from a database, operating rules associated with the second payment network. The database may store operating rules including rules and regulations relating to various payment networks, including both the first payment network and the second payment network. The operating rules may include, but are not limited to, message formatting rules for different types of messages transmitted via a specific payment network (e.g., payment messages associated with payment responses, payment approval, payment denial, request for payment, request for information, payment acknowledge, request for return of funds), technical specifications that provide details as to the required data and/or data fields for each type of message transmitted via the specific payment network, and the regulatory and policy framework including national bank regulations.

In the example embodiment, the CBP computing device applies the retrieved rules to the funds transfer message to reformat the funds transfer message to comply with the payment standards and procedures of the second payment network. For example, in some embodiments, the CBP computing device may search and analyze the information provided in each data field of the received funds transfer message to determine if each data field contains the required data (e.g., data field entries) in accordance with the retrieved operating rules. For example, the CBP computing device may reformat bank account data associated with the recipient's financial account to comply with a payment messaging format of the second payment network (e.g., adding a specific bank code and/or branch code recognized by the second payment network). In another example, separate pieces of data may be combined together under a new data field added to the funds transfer message or an existing data field to comply with a required format rule of the second payment network. Additionally or alternatively, the CBP computing device may analyze the message structure (e.g., headers, data fields, syntax) of the funds transfer message in addition to the data entries of each data field in order to assess whether or not the message structure itself needs to be modified. For example, the CBP computing device may determine that certain types of data fields need to be added or removed from the funds transfer message.

In embodiments where a proxy is used to transfer funds from the sender to the recipient, the CBP computing device may parse proxy information associated with the recipient from the received funds transfer message. The CBP computing device may subsequently compare the parsed information with registered proxies stored in a database. In these embodiments, the CBP computing device may match the parsed proxy information to a registered proxy stored in the database. The registered proxy may be linked to financial account information associated with the recipient, such as a financial account number associated with the recipient's financial account. In some embodiments, the CBP computing device may add a data field that includes the recipient's financial account number and/or other financial account information to the funds transfer message. For example, in some embodiments, the CBP computing device may use proxy information to retrieve financial account information associated with the recipient from the database. In these embodiments, the CBP computing device may append a new data field including the retrieved financial account information to the funds transfer message during the reformatting process. In other embodiments, the CBP computing device may remove data in the funds transfer message that does not comply with the payment messaging standard and protocol of the second payment network. As discussed herein, the first and second payment processing networks are not linked together in real-time prior to the CBP computing device. The CBP computing device is configured to link a real-time domestic payment processing network of a first country with a real-time domestic processing network of a second country by reformatting, in real time, a funds transfer message to comply with the rules and regulations of the second payment processing network. Thus, the CBP computing device enables funds transfer messages received over a domestic payment processing network to be processed over a different domestic processing network in real time.

In further embodiments, the CBP computing device may modify the length and configuration of data entries and/or translate character sets from a first character set (e.g., Roman characters) to a second character set (e.g., Chinese characters) to comply with payment messaging standards and protocols of the second payment network. The CBP computing device may check the reformatted funds transfer message to confirm that the message is properly formatted and that the information in the message is correct. Copies of both the reformatted funds transfer message as well as the original funds transfer message may be stored by the CBP computing device in the database.

After the CBP computing device reformats the funds transfer message to comply with the rules and regulations of the second payment network, the CBP computing device transmits the reformatted funds transfer message to the receiving bank. The receiving bank is in communication with the second payment network. Thus, the CBP computing device may transmit the reformatted funds transfer message via the second payment network. The CBP computing device may subsequently debit funds in the transfer amount from the sender's financial account at the originating bank to a sponsor bank located in the first country (e.g., first sponsor bank). "Sponsor bank" (e.g., partner bank, correspondent bank) refers to a financial institution that maintains a financial account associated with the CBP computing device (e.g., a CBP financial account), and is in communication with at least one domestic payment network of the country in which it is located in. In the example embodiment, the first sponsor bank is a financial institution that maintains a financial account associated with the CBP computing device, and is in communication with the first payment network of the first country. The CBP financial account may be a settlement financial account maintained at the first sponsor bank. Funds in the transfer amount are debited from the sender's financial account to the CBP financial account at the first sponsor bank. In some embodiments, the CBP computing device may transmit instructions to the originating bank to debit funds equal to the transfer amount from the sender's financial account to the CBP financial account at the first sponsor bank.

After the receiving bank receives the reformatted funds transfer message from the CBP computing device, the receiving bank validates the information provided in the reformatted funds transfer message. The receiving bank may parse a recipient identifier associated with the recipient's financial account from the reformatted funds transfer message. The receiving bank may subsequently verify (e.g., validate) that the recipient's financial account is valid and available for a funds transfer transaction. For example, the receiving bank may verify that a recipient's financial account number (as provided in the reformatted funds transfer message) is associated with the recipient. In some embodiments, the receiving bank transmits a message back to the CBP computing device to accept (e.g., a payment approval message) or deny (e.g., a payment denial message) the funds transfer. The receiving bank may transmit the message via the second payment network. In the example embodiment, if the receiving bank accepts the funds transfer (e.g., funds transfer instructions), the receiving bank may automatically credit funds in the transfer amount to the recipient's financial account. Thus, funds in the transfer amount are immediately available in the recipient's financial account for use by the recipient. The messages transmitted back and forth between the parties involved in the funds transfer transaction (e.g., the CBP computing device, the originating bank, the receiving bank, and/or the sponsor banks) may be formatted using the global International Organization for Standardization (ISO) 20022 network messaging standards.

In the example embodiment, the receiving bank transmits a payment acknowledgement message to the CBP computing device, confirming completion of the funds transfer transaction. The payment acknowledgement message may be transmitted to the CBP computing device via the second payment network. The payment acknowledgment message may indicate that funds in the transfer amount were successfully credited to the recipient's financial account. In response to receiving the payment acknowledgement message, the CBP computing device transmits, to the originating bank, a notification message that funds in the transfer amount have been successfully credited to the recipient's financial account. In particular, the CBP computing device may reformat the received payment acknowledgment message to comply with the formatting standards of the first payment network. In some embodiments, the notification message transmitted to the originating bank may be the reformatted payment acknowledge message. In these embodiments, copies of both the received payment acknowledge message (e.g., in the received messaging format) and the reformatted payment acknowledgement message may be stored in a database associated with the CBP computing device. In other embodiments, the notification message may include additional data fields appended by the CBP computing device. For example, the notification message may include a transaction identifier to track incoming and outgoing messages associated with one particular funds transfer transaction. The notification message may also include a portion of the payment acknowledgement message transmitted by the receiving bank. In embodiments where the notification message is not the reformatted payment acknowledge message, both the received payment acknowledge message (e.g., in the received messaging format) and the notification message transmitted to the originating bank may be stored in the database associated with the CBP computing device. In the example embodiment, the originating bank transmits the notification message from the CBP computing device to a sender's user computing device to notify the sender of the completed funds transfer transaction.

In the example embodiment, the CBP computing device stores, for each funds transfer transaction, the messages going back and forth between the originating bank, the CBP computing device, and the receiving bank. The messages may be consolidated into a single batch file (e.g., as a table) and stored for settlement, for example, in the next settlement cycle. Settlement refers to the transfer of funds between the originating bank and the receiving bank for each funds transfer transaction. Settlement, for each funds transfer transaction, may occur in real-time as the clearing process occurs (e.g., as transfer of data between the originating bank, the CBP computing device, and the receiving bank is occurring in real-time). In other embodiments, settlement may not occur in real-time but rather in the next settlement cycle. In these embodiments, settlement cycles may occur multiple times throughout the day, thereby enabling near real-time settlement of funds, or instead occur once per day (e.g., at the end of the day).

In the example embodiment, settlement occurs according to the settlement agreement between the parties (e.g., the originating bank, the first sponsor bank, the second sponsor bank, and/or the receiving bank). Funds in the transfer amount may move from the originating bank to the first sponsor bank, as described above. In accordance with settlement instructions received from the CBP computing device, the first sponsor bank may transfer funds in the transfer amount to the second sponsor bank. The second sponsor bank may be a partner bank in communication with a second payment network of the second country. In accordance with settlement instructions received from the CBP computing device, the second sponsor bank may subsequently transfer funds in the transfer amount to the receiving bank to complete the settlement process. The CBP computing device may send settlement instructions (e.g., instructions as to transferring funds in the transfer amount to a specific financial account maintained at a financial institution at a designated time) to each of the originating bank, the first sponsor bank, and/or the second sponsor bank.

The methods and systems described herein may be implemented using computer programming or engineering techniques including computer software, firmware, hardware or any combination or subset thereof, wherein the technical effect is achieved by performing at least one of: (a) receiving, by a CBP processor, a payment request message to transfer funds in real-time from a payor account associated with a payor to a payee account associated with a payee, the payment request message received from an originating bank associated with the payor, the payment request message including payment instructions and transaction information associated with a transfer amount, the payment instructions including a payor identifier and a payee identifier; (b) determining that the payment request message is a cross border payment transfer from a first payment processing network that is capable of processing real-time payments within a first country to a second payment processing network that is capable of processing real-time payments within a second country, wherein the first payment processing network and the second payment processing network utilize different messaging protocols; (c) retrieving, by the processor, a set of rules from a database to apply to the received payment request message, the set of rules being based on a payment messaging standard and protocol associated with the second payment network of the second country; (d) reformatting, by the processor, the received payment request message to comply with the payment messaging standard and protocol of the second payment network based on the retrieved set of rules; and (e) transmitting, by the processor, the reformatted payment message to a receiving bank associated with the payee to cause the receiving bank to automatically disburse funds equal to the transfer amount into the payee account. By connecting the first real-time payment network that processes payments within a first country to a second real-time payment network that processes payments within a second country using the CBP processing system, the CBP processing system enables a payor to make a cross-border real-time payment from a payor bank located in the first country to a payee bank located in the second country. In addition, by utilizing a data rich messaging protocol, the CBP processing system is able to send additional data detailing the transaction so that the parties can better track such payments.

The payor bank of the first country and the payee bank of the second country may both use a payment platform, such as a person-to-person (P2P) payment platform to connect to their respective domestic real-time payment networks. For example, the payor bank may use a payment platform, such as Mastercard Send™, to connect to a first real-time payment network of the first country. The payee bank may use the same payment platform to connect to the second real-time payment network of the second country. The first real-time payment network and the second real-time payment network have different communication protocols, and thus, are not capable of conducting a cross-border transaction in real-time by themselves. Accordingly, each domestic real-time payment network connects to the CBP computing device of the CBP processing system to transmit payments in real-time from a payor of a first country to a payee of a second country using existing domestic real-time payment networks.

The CBP computing device reformats (e.g., translates) a funds transfer message received from the payor bank via the first real-time payment network to a payment messaging format that complies with the operating rules and communication protocols associated with the second real-time payment network. The communication protocols as based on ISO 20022 network messaging standards for each domestic real-time payment network. Additionally, the CBP computing device enables the payor and payee to transmit and receive additional data, such as attachments, payment descriptors, and/or messages with each other. Thus, the CBP computing device enables enhanced data to be transmitted for ISO 20022 formatted messages.

The technical effects described herein apply to the technical field of electronically transmitting real-time cross border payments from a payor to a payee. The systems and methods described herein provide the technical advantage of enabling cross border payments to be transmitted in real-time (or near real-time) through existing domestic payment processing networks without requiring a separate network infrastructure to be developed. Further, the systems and methods described herein include transforming, updating, and/or re-formatting existing network messages of one domestic payment processing network to comply with the payment messaging protocols and regulations of a different domestic payment processing network. Additionally, the systems and methods described herein solve problems specifically arising in the computer networking and transaction processing fields (e.g., cross border payment systems). More specifically, the technical problem addressed by the systems and methods described includes at least one of the following: (i) delayed processing times associated with cross border payments (e.g., waiting several days to receive a cross border payment); (ii) inefficiency associated with tracking and identifying errors with processing a cross border payment transaction; and (iii) lack of transparency and communication with regard to a cross border payment transaction.

The resulting technical effect achieved by the systems and methods described herein is at least one of: (i) enabling cross border payments to be transmitted in real-time between different domestic payment processing networks; (ii) increasing the speed and through-put of cross border payments through existing payment processing networks by enabling real-time clearing; (iii) reducing an amount of network and computing resources needed to transmit a cross border payment through multiple domestic payment processing networks by various financial institutions; (iv) increasing transparency by enabling incoming and outgoing messages (in various formats) between multiple payment processing networks to be tracked and transmitted (e.g., as a batch file) to all parties involved in a cross border payment transaction (e.g., sender's bank, recipient's bank); (v) enabling a payment sender and a payment recipient to communicate with each other in real-time with regard to the cross border payment transaction; (vi) enabling transaction data, such as an invoice or a bill payment stub, to be transmitted along with payment instructions over an existing payment processing network; and (vii) enabling funds to be automatically credited to a payment recipient's financial account.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. The following detailed description illustrates embodiments of the disclosure by way of example and not by way of limitation. It is contemplated that the disclosure has general application to providing a cross border payment (CBP) processing system for real-time domestic and cross border payment transactions.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is an example flow diagram illustrating the real-time cross border payment process using a cross border payment (CBP) processing system 100 that includes a cross border payment (CBP) computing device 102. In particular, FIG. 1 depicts the flow of transfer data associated with a payment request message (e.g., transfer request message) between a sender 104 (e.g., a payor) and a recipient 106 (e.g., a payee) as well as the flow of funds (e.g., movement of funds) associated with a corresponding payment request message. In some embodiments, the flow of funds occurs simultaneously (or near-simultaneously) with the flow of transfer data. In other embodiments, the flow of funds occurs separately. In further embodiments, CBP processing system 100 may provide additional, fewer, or alternative transfer data and transfer data flow, including those described elsewhere herein.

In the example embodiment, sender 104 initiates 150 a payment transfer by providing a funds transfer message to a financial institution associated with sender 104, such as an originating bank 108. In the example embodiment, a financial account associated with sender 104, such as a sender financial account 110, is maintained at originating bank 108. The funds transfer message includes payment instructions for transferring funds from sender financial account 110 to a financial account associated with recipient 106, such as recipient financial account 114. Sender 104 may initiate a payment transfer by using a banking app associated with originating bank 108.

Recipient financial account 114 may be maintained at a financial institution associated with recipient 106, such as a receiving bank 112. Recipient financial account 114 is any type of financial account that is capable of receiving funds as described herein, for example, through a domestic real time rail (RTR) (e.g., real-time payment processing network). In addition, the payment instructions include a sender identifier (e.g., payor identifier) and a transfer amount. The payment instructions may further include, for example, a recipient identifier (e.g., payee identifier) associated with recipient financial account 114. In further embodiments, the payment instructions may also include information as to the country from where funds are being transferred (e.g., the country where sender financial account 110 is located) and/or information as to the country where funds are being received (e.g., the country where recipient financial account 114 is located). For example, the funds transfer message may include country codes associated with sender 104 country (e.g., first country) and recipient 106 country (e.g., second country).

In the example embodiment, in addition to payment instructions, the funds transfer message also includes transaction data (e.g., transaction information) associated with the funds transfer transaction. CBP computing device 102 enables sender 104 to send transaction details to recipient 106 in regards to the transfer amount. For example, sender 104 may be a customer in the United States who purchased $300 USD of goods online from a merchant (e.g., recipient 106) in Canada. In this example, sender 104 may elect to transmit transaction information along with the transfer amount (e.g., "this amount is for the goods purchased on X date"). Additionally or alternatively, CBP computing device 102 enables sender 104 to send an invoice or a bill payment stub (e.g., as an attachment) to recipient 106. The transaction data may include a transaction and/or invoice number associated with a purchase transaction between sender 104 and recipient 106. Additionally or alternatively, the transaction data may include details in regard to the payment being sent (e.g., "this is X amount (in USD) for hotel reservation number XYZ made on YY date"). The transaction data may further include details as to the amount to be transferred (e.g., a transfer amount), the exchange rate for the transaction as of the date of the transaction, and the transfer amount converted to the foreign currency (e.g., foreign currency amount).

In the example embodiment, originating bank 108 subsequently transmits 152 the received funds transfer message to CBP computing device 102 for real-time (or near real-time) clearing. In the example embodiment, the funds transfer message is transmitted via a domestic real time rail (RTR) payment network. In one embodiment, originating bank 108 may use a payment platform, such as Mastercard Send™, to transmit the received funds transfer message to CBP computing device 102. CBP computing device 102 recognizes the received funds transfer message as a cross border transfer transaction from the sender 104 country (e.g., first country) to recipient 106 country (e.g., second country). CBP computing device 102 may validate the data of the received funds transfer message. CBP computing device 102 may parse data associated with the first country and the second country from the received funds transfer message, and determine that funds are to be transmitted in real-time from the first country to the second country. For example, in some embodiments, CBP computing device 102 may parse country identifiers from the received funds transfer message. In particular, CBP computing device 102 may use the parsed data to determine that the funds transfer message was received via a first payment network associated with the first country. For example, CBP computing device 102 may recognize that sender 104 country is the United States (U.S.), and that the funds transfer message was transmitted by originating bank 108 via a U.S. real-time rail (RTR) utilizing The Clearing House (TCH) RTP® network. In another example, CBP computing device 102 may detect that the funds transfer message was transmitted by originating bank 108 to CBP computing device 102 via the Automated Clearing House (ACH) network.

In the example embodiment, CBP computing device 102 retrieves, from a database, operating rules associated with the second payment network. The database may store operating rules including rules and regulations relating to various payment networks, including both the first payment network and the second payment network. The operating rules may include, but are not limited to, message formatting rules for different types of messages transmitted via a specific payment network (e.g., payment messages associated with payment responses, payment approval, payment denial, request for payment, request for information, payment acknowledge, request for return of funds), technical specifications that provide details as to the required data and/or data fields for each type of message transmitted via the specific payment network, and the regulatory and policy framework including national bank regulations.

In the example embodiment, CBP computing device 102 applies the retrieved rules to the funds transfer message to reformat the funds transfer message to comply with the payment standards and procedures of the second payment network. For example, in some embodiments, CBP computing device 102 may search and analyze the information provided in each data field of the received funds transfer message to determine if each data field contains the required data in accordance with the retrieved operating rules. After CBP computing device 102 reformats the funds transfer message to comply with the rules and regulations of the second payment network, CBP computing device 102 transmits 154 the reformatted funds transfer message to receiving bank 112. Receiving bank 112 is in communication with the second payment network. Thus, CBP computing device 102 may transmit the reformatted funds transfer message via the second payment network. CBP computing device 102 may subsequently instruct 156 originating bank 108 to debit funds in the transfer amount from sender financial account 110 at originating bank 108 to a first sponsor bank 116. More specifically, the funds are debited from sender financial account 110 to a cross border payment (CBP) financial account maintained at first sponsor bank 116. The CBP financial account is associated with CBP computing device 102.

After receiving bank 112 receives the reformatted funds transfer message from CBP computing device 102, receiving bank 112 validates the information provided in the reformatted funds transfer message. Receiving bank 112 may verify (e.g., validate) that recipient financial account 114 is valid and available for a funds transfer transaction. In some embodiments, receiving bank 112 transmits a message back to CBP computing device 102 to accept (e.g., a payment approval message) or deny (e.g., a payment denial message) the funds transfer. Receiving bank 112 may transmit the message via the second payment network. In the example embodiment, if receiving bank 112 accepts the funds transfer (e.g., funds transfer instructions), receiving bank 112 may automatically credit funds in the transfer amount to recipient financial account 114. Thus, funds in the transfer amount are immediately available in recipient financial account 114 for use by recipient 106.

CBP computing device 102 may append an additional data field to the original (e.g., received) funds transfer message prior to transmitting the funds transfer message to receiving bank 112. The additional data field may correspond to (and include) a funds credit instruction. The funds credit instruction may be as small as one bit occupied by a 0 or 1. A 0 may represent a "null" or no instruction, and a 1 may represent an automatic "action" or "initiate" instruction. Alternatively, the funds credit instruction may have any other length, format, or configuration. An automatic initiation funds credit instruction triggers receiving bank 112 to automatically deposit (e.g., credit) funds in the transfer amount to recipient financial account 114.

In the example embodiment, CBP computing device 102 receives 158, from receiving bank 112, a payment acknowledgement message confirming completion of the funds transfer transaction. The payment acknowledgement message may be transmitted to CBP computing device 102 via the second payment network. The payment acknowledgment message may indicate that funds in the transfer amount were successfully credited to recipient financial account 114. Receiving bank 112 may also transmit 160, to a user computing device associated with recipient 106, a notification message alerting recipient 106 of the credit to recipient financial account 114.

In the example embodiment, in response to receiving the payment acknowledgement message, CBP computing device 102 transmits 162, to originating bank 108, a notification message that funds in the transfer amount have been successfully credited to recipient financial account 114. In particular, CBP computing device 102 may reformat the received payment acknowledgment message to comply with the payment messaging standards and protocols of the first payment network. In some embodiments, the notification message transmitted to originating bank 108 may be the reformatted payment acknowledge message. In the example embodiment, originating bank 108 transmits 164 the notification message from CBP computing device 102 to a user computing device associated with sender 104 (e.g., user computing device 306, shown in FIG. 3) to notify sender 104 of the completed funds transfer transaction.

In the example embodiment, settlement occurs according to the settlement agreement between the parties (e.g., originating bank 108, first sponsor bank 116, second sponsor bank 118, and/or receiving bank 112). In accordance with settlement instructions received from CBP computing device 102, first sponsor bank 116 transfers 166 funds in the transfer amount to second sponsor bank 118. Similarly, in accordance with settlement instructions received from CBP computing device 102, second sponsor bank 118 subsequently transfers 168 funds in the transfer amount to receiving bank 112 to complete the settlement process. In this embodiment, CBP computing device 102 may transmit settlement instructions (e.g., instructions as to transferring funds in the transfer amount to a specific financial account maintained at a financial institution at a designated time) to each of originating bank 108, first sponsor bank 116, and/or second sponsor bank 118.

Figure 2:
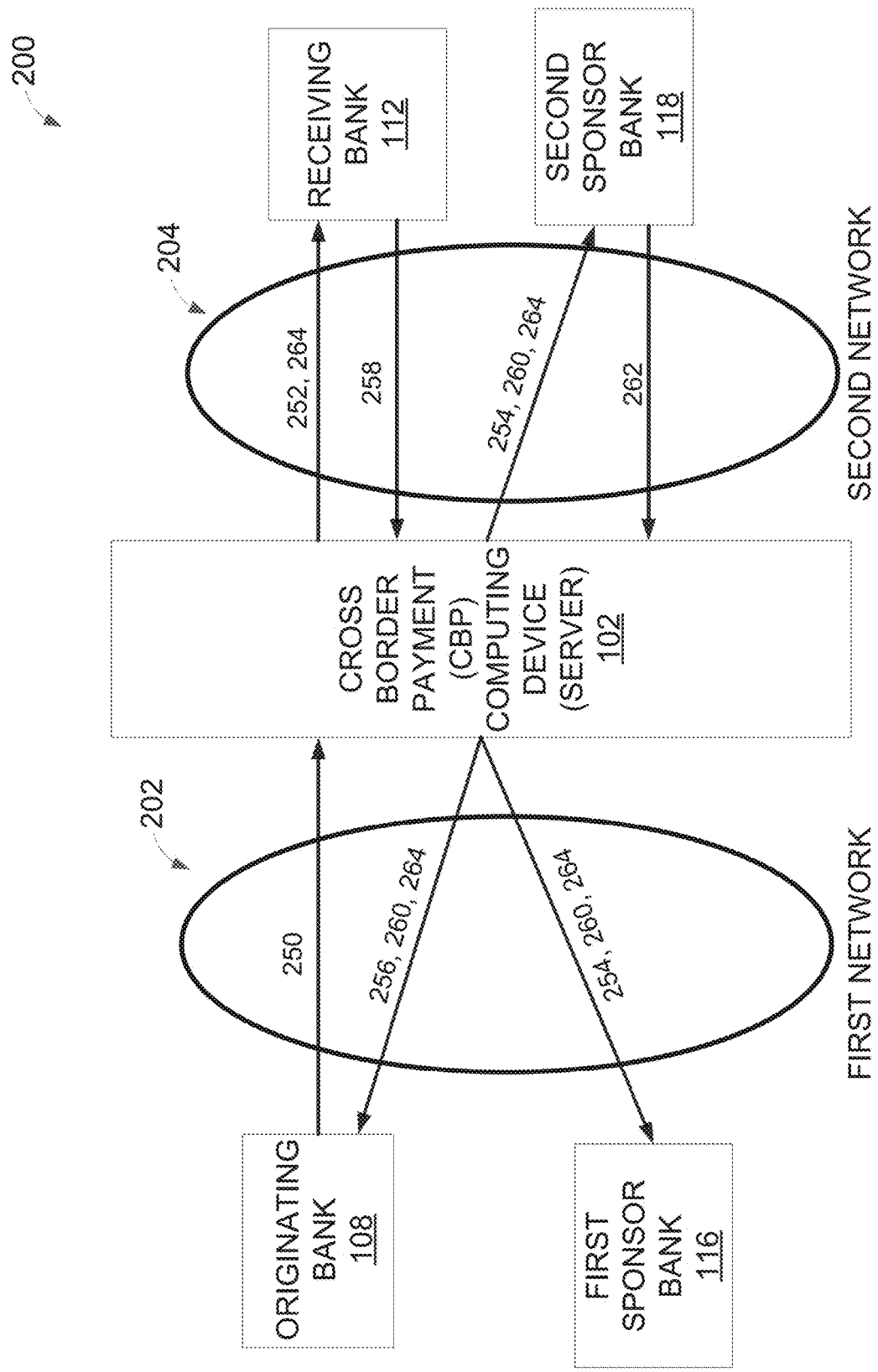

FIG. 2 is an example flow diagram illustrating the flow of data between various components of the cross border payment (CBP) processing system shown in FIG. 1. In particular, FIG. 2 depicts a flow of transfer data between originating bank 108 (shown in FIG. 1) of a first payment network, such as a first payment processing network (e.g., first network) 202, and receiving bank 112 (shown in FIG. 1) of a second payment network, such as a second payment processing network (e.g., second network) 204, in accordance with an example funds transfer transaction. First network 202 is a real-time payment processing network for processing domestic payment transactions within one country, and second network 204 is a separate real-time payment processing network for processing domestic payment transactions within another country.

In the example embodiment, originating bank 108 transmits 250 a funds transfer message (e.g., a payment message) to CBP computing device 102 via a domestic RTR payment network in communication with originating bank 108, such as first network 202. This payment message can be sent by originating bank 108 using a payment platform, such as Mastercard Send™. For example, first network 202 may be an electronic payment network of Singapore, such as Singapore's RTR FAST (Fast And Secure Transfers) payment network. In the example embodiment, funds transfer message includes (i) payment instructions for transmitting a real-time payment from a customer of originating bank 108, such as sender 104 to a customer of receiving bank 112, such as recipient 106 (both shown in FIG. 1), and (ii) transaction data associated with payment (e.g., details as to what the payment is for). CBP computing device 102 recognizes the received funds transfer message as a real-time cross border funds transfer transaction from a first payment processing network for processing real-time payments within a first country to a second payment processing network for processing real-time payments within a second country. More specifically, CBP computing device 102 recognizes that the funds transfer message is traveling from a first payment network, such as first network 202, to a different payment network, such as second network 204. In the example embodiment, first network 202 and second network 204 utilize different messaging protocols. CBP computing device 102 reformats (e.g., translates) the received funds transfer message to a payment format that complies with the payment messaging standards and regulations of second network 204. In some embodiments, CBP computing device 102 verifies whether receiving bank 112 is capable of processing cross border funds transactions in real-time. CBP computing device 102 may retrieve payment regulations and standards of second network 204 from a database to verify whether real-time processing in the second country and/or by receiving bank 112 is viable.

After reformatting the received funds transfer message, CBP computing device 102 transmits 252 the reformatted funds transfer message to receiving bank 112. The reformatted message may be transmitted via second payment network 204. The reformatted message can be sent over second payment network 204 using a payment platform such as, for example, Mastercard Send™. CBP computing device 102 may also transmit 254 a notification message to first sponsor bank 116 and/or second sponsor bank 118 of the pending funds transfer transaction. For example, the notification message to the sponsor banks may be select information from the received funds transfer message, such as the payment instruction. Additionally or alternatively, the notification message may further include information regarding the transaction transfer and settlement instructions from CBP computing device 102 to each sponsor bank 116 and 118. CBP computing device 102 may also transmit 256 a notification message to originating bank 108 acknowledging receipt of the funds transfer message. The notification message may also notify originating bank 108 that the received funds transfer message was transmitted to receiving bank 112. In some embodiments, the notification message may also include instructions to debit funds in the transfer amount from a financial account associated with sender 104, such as sender financial account 110 (shown in FIG. 1) to a financial account associated with CBP computing device 102 at first sponsor bank 116.

In the example embodiment, CBP computing device 102 receives 258, from receiving bank 112, a payment approval message accepting the payment (e.g., funds in the transfer amount). Receiving bank 112 may verify that a financial account associated with recipient 106 (such as recipient financial account 114 as shown in FIG. 1), as provided in the reformatted funds transfer message, is valid and available to receive funds from sender 104. Subsequently, receiving bank 112 may automatically credit funds in the transfer amount to recipient financial account 114 to complete the funds transfer transaction. Receiving bank 112 may then transmit the payment approval message to CBP computing device 102, the payment approval message indicating that (i) receiving bank 112 has accepted the payment and (ii) recipient financial account 114 has been credited with funds in the transfer amount. In some embodiments, the payment approval message may only indicate that receiving bank 112 has accepted the payment. In these embodiments, receiving bank 112 may subsequently transmit an acknowledgement message to CBP computing device 102, acknowledging completion of the funds transfer transaction (e.g., successful completion of crediting funds in the transfer amount to recipient financial account 114).

CBP computing device 102 subsequently transmits 260 notification messages as to the completed funds transfer transaction to originating bank 108 and the sponsor banks 116 and 118. For example, the notification messages may indicate that funds in the transfer amount have been successfully credited to recipient financial account 114 by receiving bank 112 at a specific time and/or date. In some embodiments, the notification messages to the sponsor banks 116 and 118 may further include details as to subsequent settlement procedures that need to be taken by each sponsor bank 116 and 118. In regards to settlement, in the example embodiment, second sponsor bank 118 transmits 262 a settlement statement to CBP computing device 102. In further embodiments, each party involved in the settlement process, such as first sponsor bank 116 and receiving bank 112, may also transmit settlement statements to CBP computing device 102. For example, receiving bank 112 may transmit a settlement statement to CBP computing device 102 indicating that funds of X amount (in the currency of receiving bank's 112 country) are owed for a specific settlement cycle. In another example, first sponsor bank 116 may transmit a settlement statement to CBP computing device 102 stating that funds of X amount (in the currency of first sponsor bank's 116 country) need to be moved to second sponsor bank 118 in accordance with settlement instructions received from CBP computing device 102.

For real-time settlements, each settlement statement may include settlement details as to one specific funds transfer transaction. For settlements that do not occur in real-time, settlement statements may include details as to all funds transfer transactions for a given settlement cycle (e.g., a batch file). CBP computing device 102 may transmit 264 the batch file and/or single funds transfer transaction files (as well as any other stored funds transfer transaction data) to one or more involved parties (e.g., originating bank 108, first sponsor bank 116, second sponsor bank 118, and/or receiving bank 112) to settle the funds for one or more funds transfer transaction. Thus, in the example embodiment, first sponsor bank 116, second sponsor bank 118, and/or receiving bank 112 may directly settle funds with CBP computing device 102 in accordance with each party's settlement cycle and procedures (e.g., real-time settlement for each funds transfer transaction, settlement once at the end of the day, settlement multiple times per day). In some embodiments, CBP computing device 102 may reformat the received settlement statements before transmitting all or parts of the received settlement statements between the parties.

Figure 3:
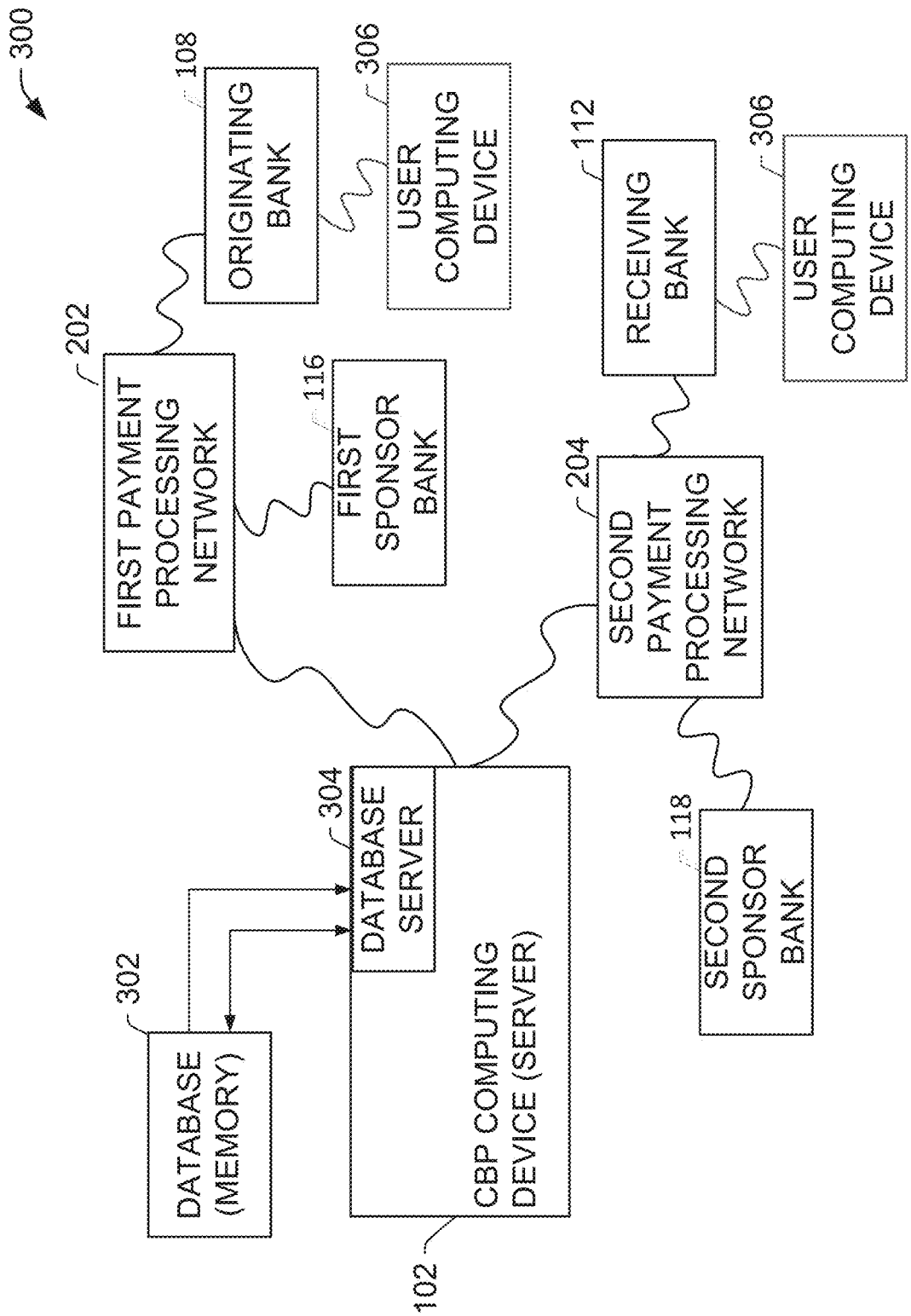

FIG. 3 is an example environment 300 showing a simplified block diagram of CBP processing system 100, including CBP computing device (e.g., CBP server) 102 (all shown in FIG. 1), for processing real-time cross border payment transactions between two domestic real-time payment processing networks, such as payment processing networks 202 and 204 (both shown in FIG. 2). CBP processing system 100 may be used to implement method 600 (shown in FIG. 6).

In the example embodiment, CBP processing system 100 includes CBP computing device 102, and may be used for transmitting cross border data rich payments in real-time from a sender (e.g., payor) associated with a first domestic real-time payment processing network, such as sender 104 (shown in FIG. 1), to a recipient (e.g., payee) associated with a second domestic real-time payment processing network, such as recipient 106 (shown in FIG. 1). In some embodiments, CBP computing device 102 may be in communication with originating bank 108, receiving bank 112, first sponsor bank 116, and/or second sponsor bank 118 via Application Programming Interface (API) calls. For example, through API calls, originating bank 108 and receiving bank 112 may transmit and receive funds transfer transaction data with CBP computing device 102.

More specifically, CBP computing device 102 includes at least one processor in communication with a memory (also referred to herein as database 302). In some embodiments, the memory may include one or more storage devices, including cloud storage devices, internal memory devices, non-centralized databases, and/or combinations thereof. In the example embodiment, the memory includes database 302 and database server 304. CBP computing device 102 may include database server 304, which may be communicatively coupled to database 302 that stores data. In some embodiments, database server 304 is in remote communication with database 302.

Database 302 may include one or more tables for tracking funds transfer data associated with each funds transfer message processed by CBP computing device 102. For example, database 302 may include funds transfer messages including payment instructions and transaction data from originating bank 108, reformatted funds transfer messages transmitted to receiving bank 112, payment approval and/or denial messages, settlement instructions transmitted to sponsor banks 116, 118, notification messages, and/or any other messages transmitted back and forth between parties to a funds transfer transaction. Additionally or alternatively, database 302 may include payment and message formatting rules and regulations associated with both first payment processing network 202 and second payment processing network 204. First payment processing network may be the same as first network 202, and second payment processing network 204 may be the same as second network 204 (both shown in FIG. 2). In the example embodiment, CBP computing device 102 may retrieve, from database 302, rules associated with second payment processing network 204 to reformat received funds transfer messages to a messaging format that complies with the regulations and payment messaging protocols governing second payment processing network 204.

In the example embodiment, CBP computing device 102 is in communication with at least two payment processing networks, such as first payment processing network 202 and second payment processing network 204. As described above, payment processing networks 202 and 204 are separate domestic real-time payment processing networks of different countries. For example, first payment processing network 202 may be a RTR payment network within the United States, such as the United States' TCH real-time payment network, while second payment processing network 204 may be a RTR payment network within Singapore, such as Singapore's FAST payment network. In the example embodiment, payment processing networks 202 and 204 each include at least one payment processor for processing payment transactions. First payment processing network 202 may be communicatively coupled to originating bank 108 and first sponsor bank 116. Originating bank 108 may be communicatively coupled to user computing device 306 associated with sender 104. In the example embodiment, sender 104 transmits a funds transfer message to originating bank 108 through an application (app) via user computing device 306. Originating bank 108 determines whether to approve or decline the request for authorization. Originating bank 108 receives the funds transfer message and authorizes the funds transfer transaction, and subsequently transmits the funds transfer message to CBP computing device 102 via first payment processing network 202. In some embodiments, upon approval, originating bank 108 may decrease the available balance of sender financial account 110 (shown in FIG. 1) by the transfer amount. Funds in the transfer amount may subsequently be transmitted via first payment processing network 202 to a financial account associated with CBP processing system 100 at first sponsor bank 116 for settlement.

CBP computing device 102 reformats the received funds transfer message and transmits the reformatted message via second payment processing network 204 to receiving bank 112. Receiving bank 112 may be communicatively coupled to user computing device 306 associated with recipient 106. Second payment processing network 204 may also be communicatively coupled to second sponsor bank 118. For example, CBP computing device 102 may transmit settlement instructions and/or details in regards to a particular funds transfer message to second sponsor bank 118. In the example embodiment, receiving bank 112 transmits a notification message to user computing device 306 associated with recipient 106 to notify recipient 106 as to the funds credited to recipient's account (same as recipient financial account 114 shown in FIG. 1). In some embodiments, recipient 106 may transmit messages to sender 104 via CBP computing device 102.

User computing devices 306 are computers including a web browser, such that CBP computing device 102 is accessible to computing devices 306 using the Internet. User computing devices 306 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although not shown, sponsor banks 116 and 118 may also include computing devices similar to user computing devices 306 that are communicatively coupled to CBP computing device 102.

Figure 4:
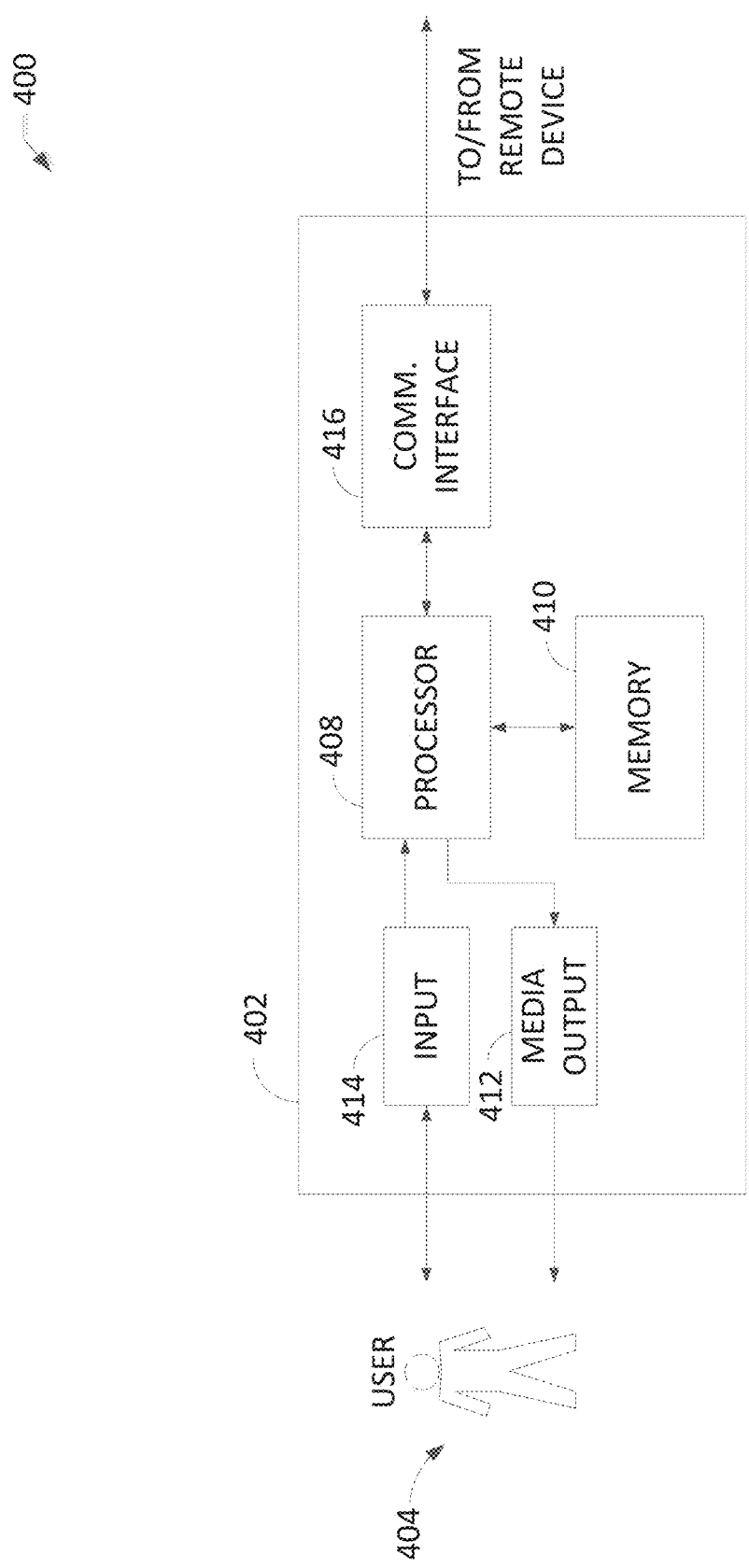

FIG. 4 depicts an exemplary configuration 400 of a client computing device 402, such as user computing devices 306 (shown in FIG. 3) and any other user computing device in communication with CBP computing device 102 (shown in FIG. 1), in accordance with one embodiment of the present disclosure. Client computing device 402 is operated by a user 404 that may be, for example, sender 104 and/or recipient 106 (shown in FIG. 1). Computing device 402 includes a processor 408 for executing instructions. In some embodiments, executable instructions are stored in a memory area 410. Processor 408 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 412 for presenting information to a user 404. For example, media output component 412 may cause client computing device 402 to display the example screenshots depicted in FIGS. 8-16. Media output component 412 is any component capable of conveying information to user 404. In some embodiments, media output component 412 includes an output adapter such as a video adapter and/or an audio adapter. An output adapter is operatively coupled to processor 408 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 412 is configured to present an interactive user interface (e.g., a web browser or client application) to user 404.

In some embodiments, client computing device 402 includes an input device 414 for receiving input from user 404. Input device 414 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 412 and input device 414.

Computing device 402 may also include a communication interface 416, which is communicatively coupleable to a remote device such as CBP computing device 102 (shown in FIG. 1). Communication interface 416 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 410 are, for example, computer-readable instructions for providing a user interface to user 404 via media output component 412 and, optionally, receiving and processing input from input device 414. A user interface may include, among other possibilities, a web browser and/or a client application capable of generating a user interface transmitted by, for example, CBP computing device 102. Web browsers enable users 404 to display and interact with media and other information typically embedded on a web page or a website from a web server associated with, for example, a financial institution in communication with CBP computing device 102, such as originating bank 108 and receiving bank 112 (both shown in FIG. 1). A client application allows users 404 to interact with a server application associated with, for example, CBP computing device 102 and/or other components of CBP processing system 100 (shown in FIG. 1). For example, instructions may be stored by a cloud service and the output of the execution of the instructions sent to the media output component 412.

Figure 5:
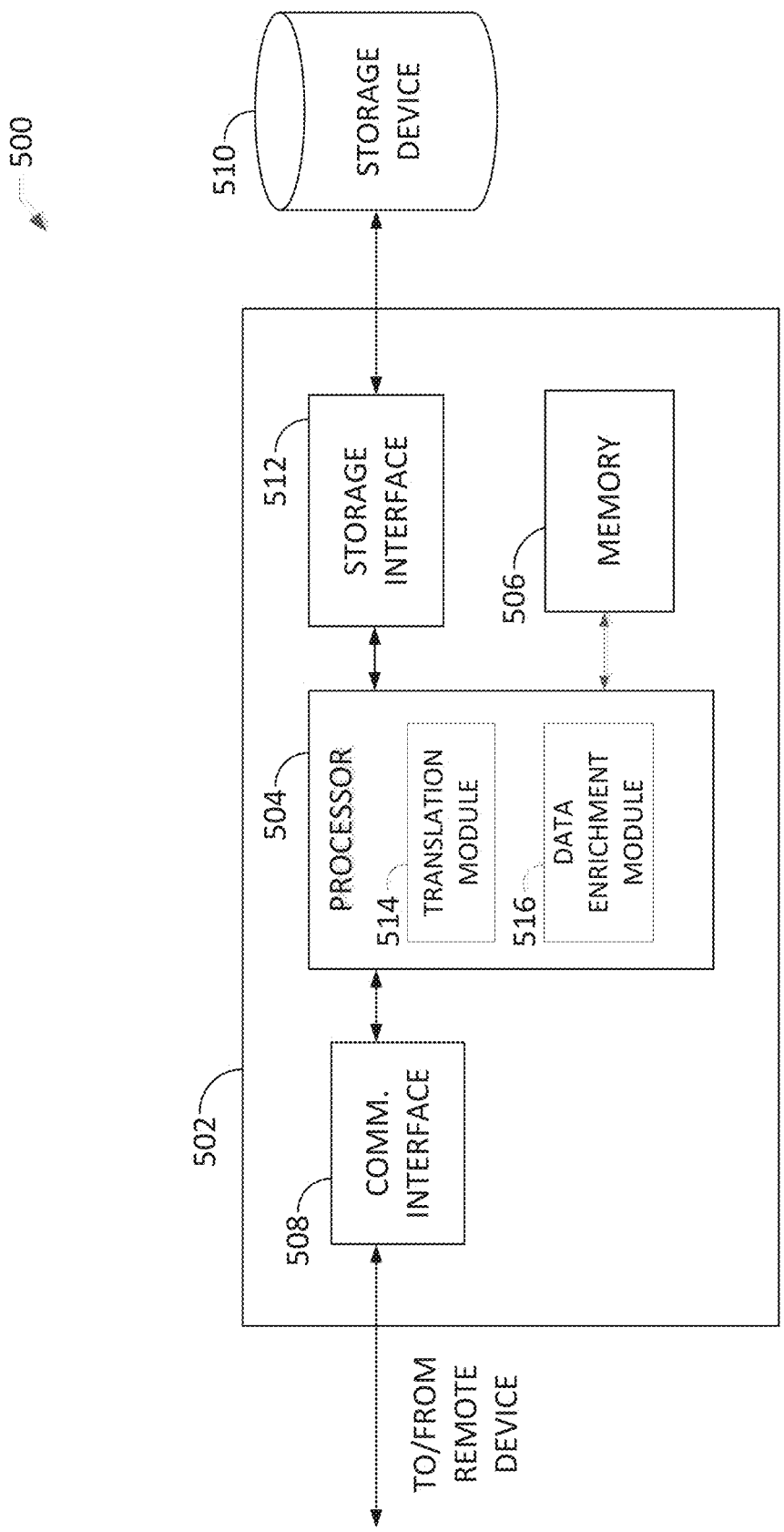

FIG. 5 illustrates an example configuration 500 of a server computing device 502, such as CBP computing device 102 for use in cross border payment (CBP) processing system 100 (both shown in FIG. 1). Server computing device 502 includes a processor 504 for executing instructions. Instructions may be stored in a memory area 506, for example. Processor 504 may include one or more processing units (e.g., in a multi-core configuration).

In the example embodiment, processor 504 is operable to execute modules, such as a translation module 514 and a data enrichment module 516. Modules 514 and 516 may include specialized instruction sets and/or coprocessors. In the example embodiment, translation module 514 is utilized to reformat (e.g., translate) a funds transfer message received over a domestic real-time payment processing network of a first country, such as first payment processing network 202, to a payment messaging format that complies with payment messaging standards and regulations of a domestic real-time payment processing network of a second country, such as second payment processing network 204 (both shown in FIG. 2). Translation module 514 may be utilized to (i) retrieve payment regulations and standards of second payment processing network 204, (ii) determine whether the information provided in each data field of the received funds transfer message contains the data fields and/or data field entries required to process the funds transfer message over second payment processing network 204, and (iii) reformat the received funds transfer message in accordance with the retrieved operating rules.

In the example embodiment, data enrichment module 516 is utilized to enable the payment sender and recipient to transmit and receive additional transaction data with each other in real-time. Data enrichment module 516 may be utilized to enable the payment sender to include a message, additional transaction data, and/or attachments for the payment recipient as part of the funds transfer transaction. In particular, data enrichment module 516 may be utilized to enable the payment recipient to communicate additional data in real-time regarding the funds transfer transaction, such as an invoice number, an invoice or bill payment stub corresponding to the funds transfer amount, and/or a description providing a reason for the funds payment transfer. Processor 504 is operatively coupled to a communication interface 508 such that server computing device 502 is capable of communicating with a remote device such as computing device 402 (shown in FIG. 4) or another server computing device 502. For example, communication interface 508 of CBP computing device 102 may receive various funds transfer transaction data from computing devices associated with originating bank 108, receiving bank 112, first sponsor bank 116, and/or second sponsor bank 118 via the Internet, as illustrated in FIG. 2.

Processor 504 may also be operatively coupled to a storage device 510. Storage device 510 is any computer-operated hardware suitable for storing and/or retrieving data. For example, database 302 (shown in FIG. 3) may be implemented on storage device 510. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510, such that CBP computing device 102 is capable of communicating with database 302 (shown in FIG. 3). Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 6:
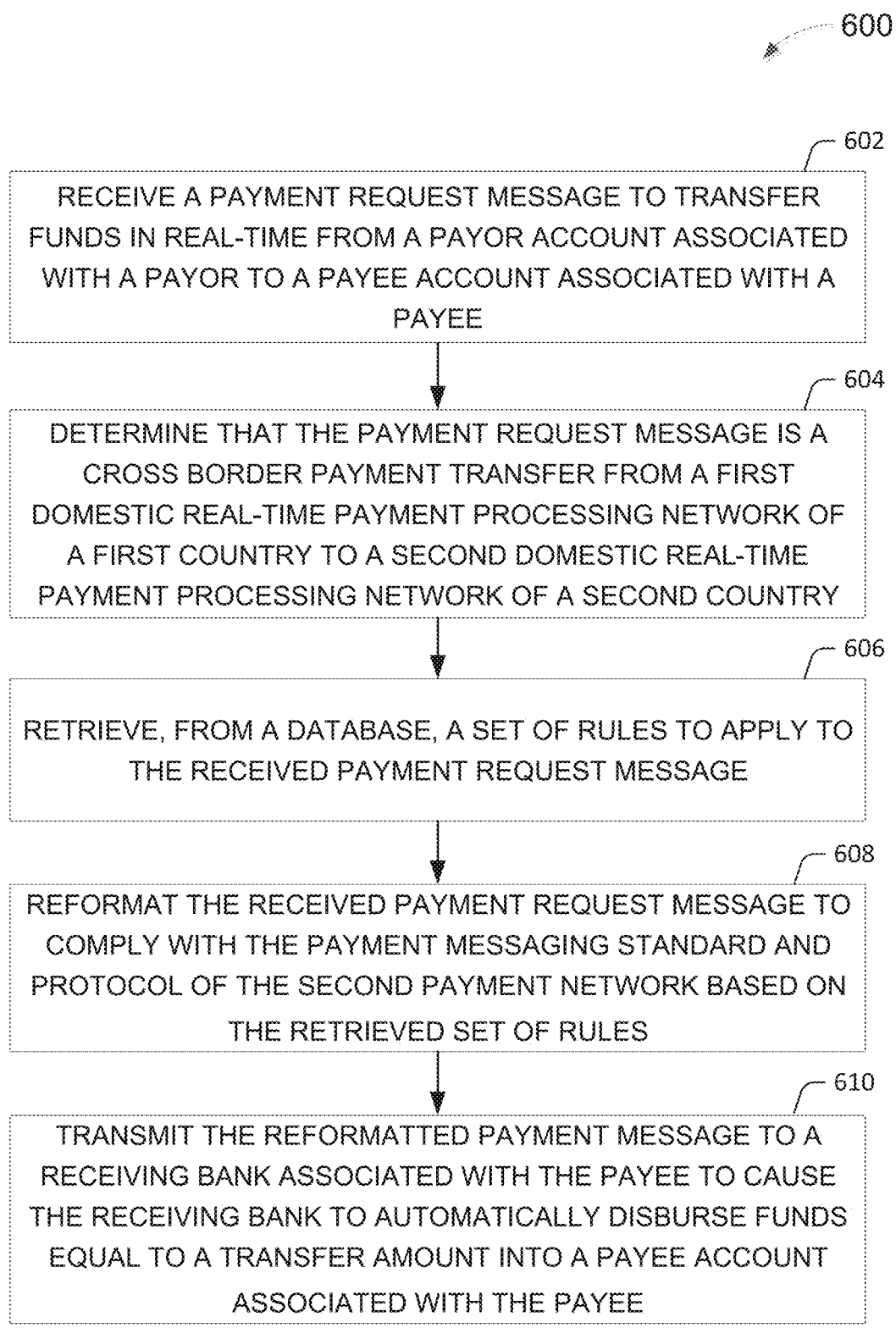

FIG. 6 is a flowchart of a method 600 for transmitting cross border data rich payments in real-time from a payor, such as sender 104 associated with first payment processing network 202, to a payee, such as recipient 106 associated with second payment processing network second payment network 204 (all shown in FIG. 3).

In the illustrated embodiment, method 600 includes receiving 602 a payment request message to transfer funds in real-time from a payor account associated with a payor, such as sender financial account 110 to a payee account associated with a payee, such as recipient financial account 114 (both shown in FIG. 1). The payment request message may include (i) payment instructions including a transfer amount, a payor identifier and a payee identifier, and (ii) transaction information associated with the transfer amount (e.g., details as to what the transfer amount is for). Method 600 further includes determining 604 that the payment request message is a cross border payment transfer from a first domestic real-time payment processing network of a first country to a second domestic real-time payment processing network of a second country. The first domestic real-time payment processing network and the second domestic real-time payment processing network utilize different messaging protocols. Method 600 also includes retrieving 606, from a database (such as database 302 shown in FIG. 3), a set of rules to apply to the received payment request message. The set of rules may be based on payment regulations, messaging standards and protocols, and/or guidelines associated with operating the second payment network. For example, the database may include rules as to payment messaging formats specific to cross border payments made through the second payment network.

Method 600 further includes reformatting 608 the received payment request message based on the retrieved set of rules to comply with the payment messaging standard and protocol of the second payment network. Method 600 also includes transmitting 610 the reformatted payment message to a receiving bank associated with the payee to cause the receiving bank to automatically disburse funds equal to a transfer amount into a payee account associated with the payee. It should be readily understood that method 600 may include additional, fewer, and/or alternative steps in one or more embodiments.

Figure 7:
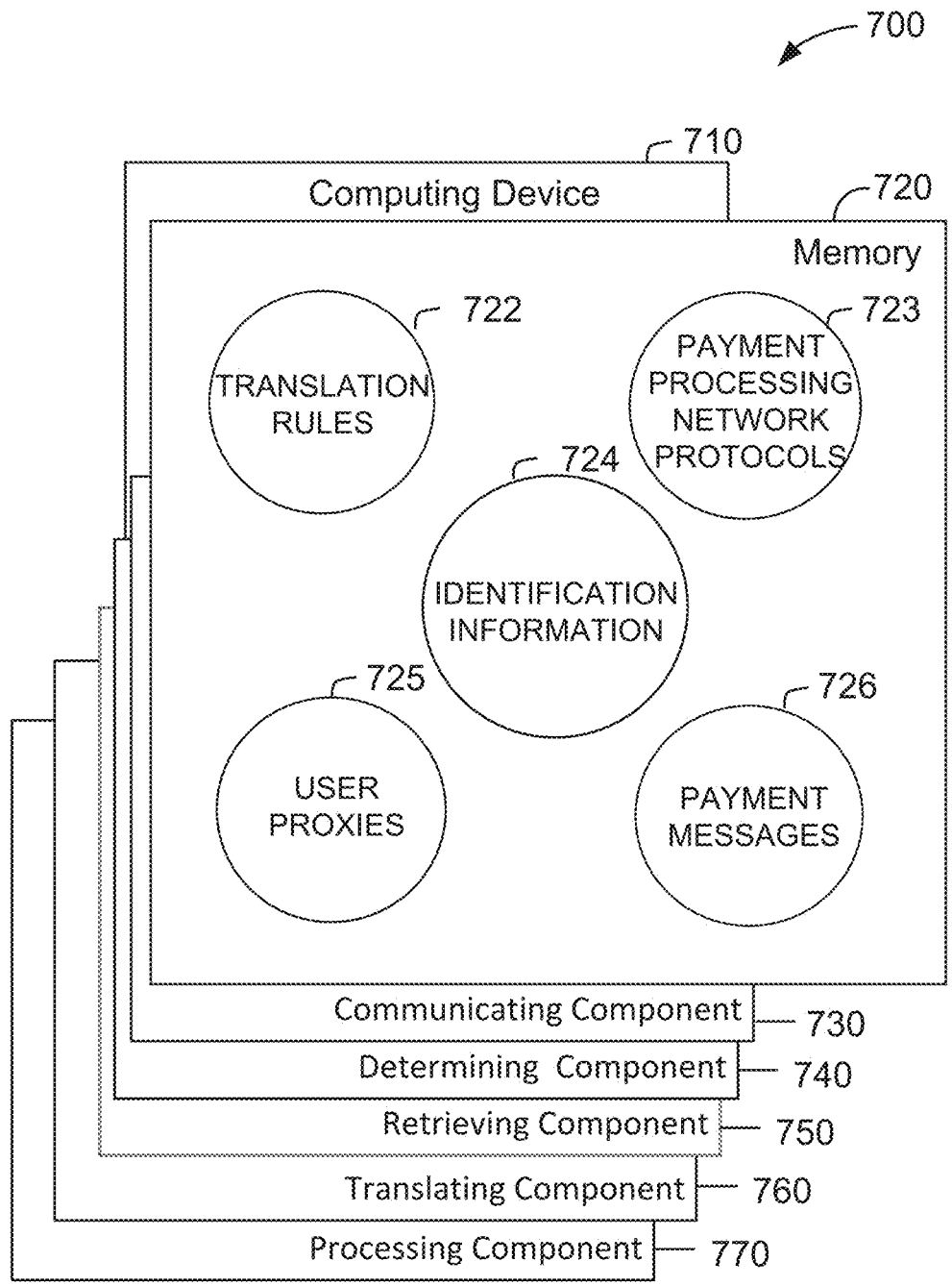

FIG. 7 depicts a diagram 700 of components of one or more example computing devices 710 that may be used in method 600 (shown in FIG. 6). In some embodiments, computing device 710 is similar to CBP computing device 102 (shown in FIG. 1). Computing device 710 includes a database 720 configured to store various information. Database 720 may be similar to database 302 (shown in FIG. 3). Database 720 may be coupled with several separate components within computing device 710, which perform specific tasks. In the illustrated embodiment, database 720 is divided into a plurality of sections and stores, including but not limited to, translation rules 722 (which may include payment messaging and formatting rules associated with specific payment processing networks, currency conversion metrics, and/or a database of languages for translating messages from one language to another), and payment processing network protocols 723 (which may include domestic as well as international laws, regulations, and/or messaging standards that govern the transfer of payment data within a specific country and between countries). In particular, translation rules 722 and payment processing network protocols 723 may include the technical specifications that govern the various payment processing networks of each country. For example, database 720 may include the technical specifications for the RTR payment network (e.g., TCH) as well as the ACH payment network of the United States. Database 720 may further include the technical specifications for the global ISO 20022 and/or ISO 8583 network messaging standards.

Database 720 may also include identification information 724 as to financial institutions (e.g., bank codes), sponsor banks affiliated with CBP computing device 102 (e.g., a list of sponsor banks and their country of location), and senders 104 and recipients 106 (both shown in FIG. 1). Database 720 may include user proxies 725 (which may be a proxy database that includes proxies of all registered recipients), and payment messages 726. Payment messages 726 may include any messages transmitted back and forth between parties to a funds transfer transaction, such as originating bank 108, receiving bank 112, first sponsor bank 116, and/or second sponsor bank 118. Payment messages 726 may further include copies of original and reformatted funds transfer messages as well as any and all notification messages transmitted by CBP computing device 102 to any party, described above, to a funds transfer transaction. CBP computing device 102 may append an additional field that contains a transaction identifier to each message that is transmitted between CBP computing device 102 and the involved parties in order to easily track, for example in a table, and subsequently retrieve all messages associated with a particular funds transfer transaction for clearing and settlement between the parties.

In the example embodiment, computing device 710 includes a communicating component 730 configured to receive, from a financial institution such as originating bank 108 (shown in FIG. 1), a payment request message to transfer funds in real-time from a payor account associated with a payor to a payee account associated with a payee. Communicating component 730 is also configured to transmit messages to financial institutions, such as a reformatted payment message (e.g., reformatted funds transfer message) to receiving bank 112, notification messages to originating bank 108 and receiving bank 112, and settlement instructions to first sponsor bank 116 and second sponsor bank 118 (all shown in FIG. 1). Computing device 710 further includes a determining component 740 configured to determine that a payment request message received from originating bank 108 is a cross border payment transfer transaction from a first payment processing network to a second payment processing network, where the first payment processing network is different from the second payment processing network. Computing device 710 also includes a retrieving component 750 configured to retrieve, from a database, such as database 720, a set of rules to apply to the received payment request message. Retrieving component 750 is configured to retrieve a set of rules that are based on a payment messaging standard and protocol associated with a specific payment network, such as second payment processing network 204 (shown in FIG. 2). Computing device 710 further includes a translating component 760 configured to reformat a received payment request message to comply with a payment messaging standard and protocol of a specific payment processing network, such as second payment processing network 204, based on the set of rules retrieved from database 720.

Figure 8:
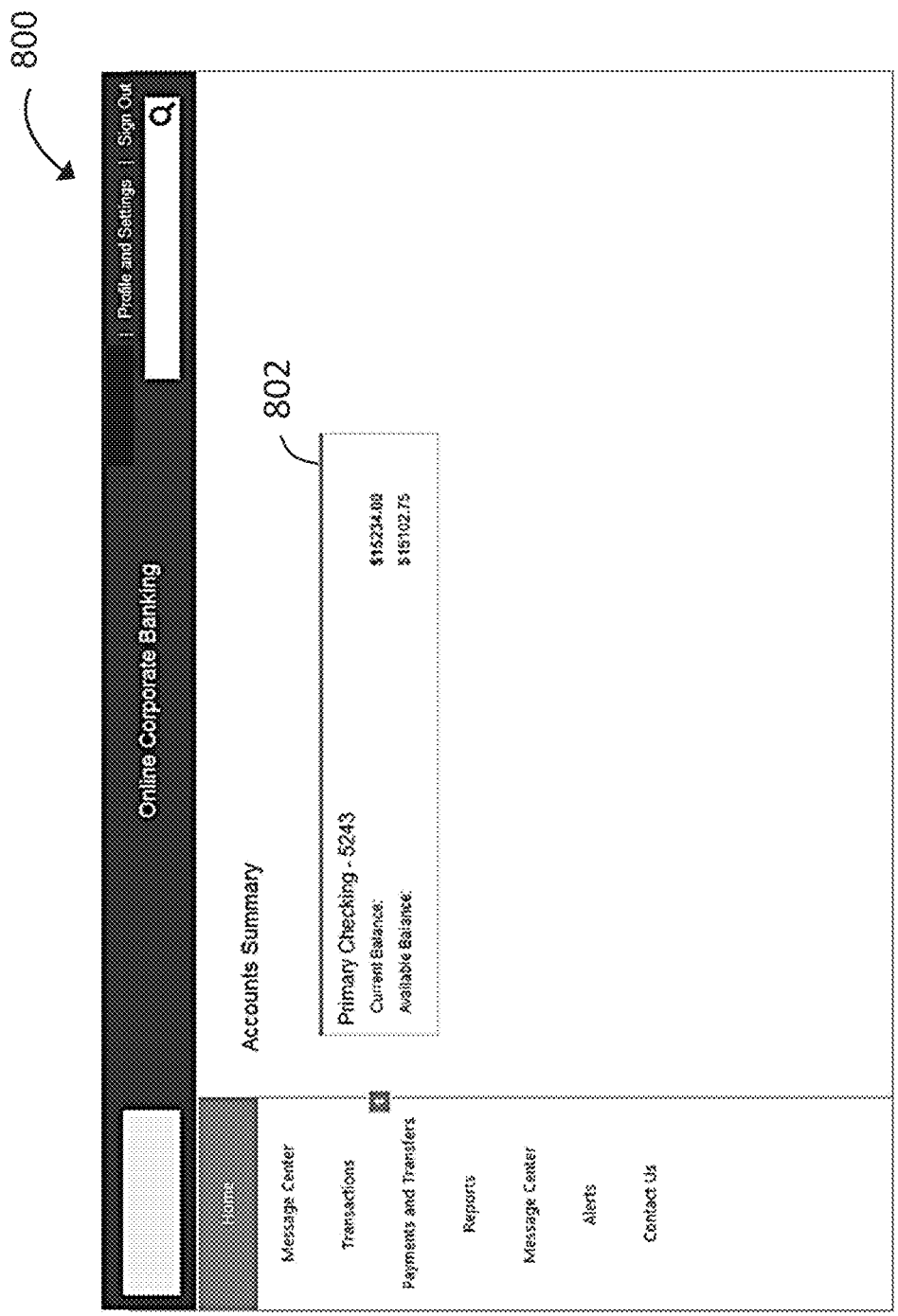

FIG. 8 is a first example screenshot displayed on a user interface of a user computing device (e.g., client computing device 402, shown in FIG. 4) associated with sender 104 (shown in FIG. 1) displaying an example user interface 800 for initiating a data rich cross border payment through sender's 104 financial institution (e.g., originating bank 108, shown in FIG. 1) using CBP computing device 102, as described above. User interface 800 may be hosted by originating bank 108, or otherwise made accessible to a user, such as sender 104 and recipient 106 (both shown in FIG. 1) by CBP computing device 102.

User interface 800 provides a login page that displays sender's 104 financial accounts summary 802. In the example embodiment, user interface 800 is displayed after sender 104 logs into a banking app associated with their financial institution (e.g., originating bank 108, shown in FIG. 1) to access their financial account(s) information. Financial accounts summary 802 may include details as to any and all financial accounts associated with sender 104 (sender financial account 110, shown in FIG. 1) that are maintained at originating bank 108. Financial accounts summary 802 may include details as to the current balance and available balance of each financial account associated with sender 104 at originating bank 108.

Figure 9:
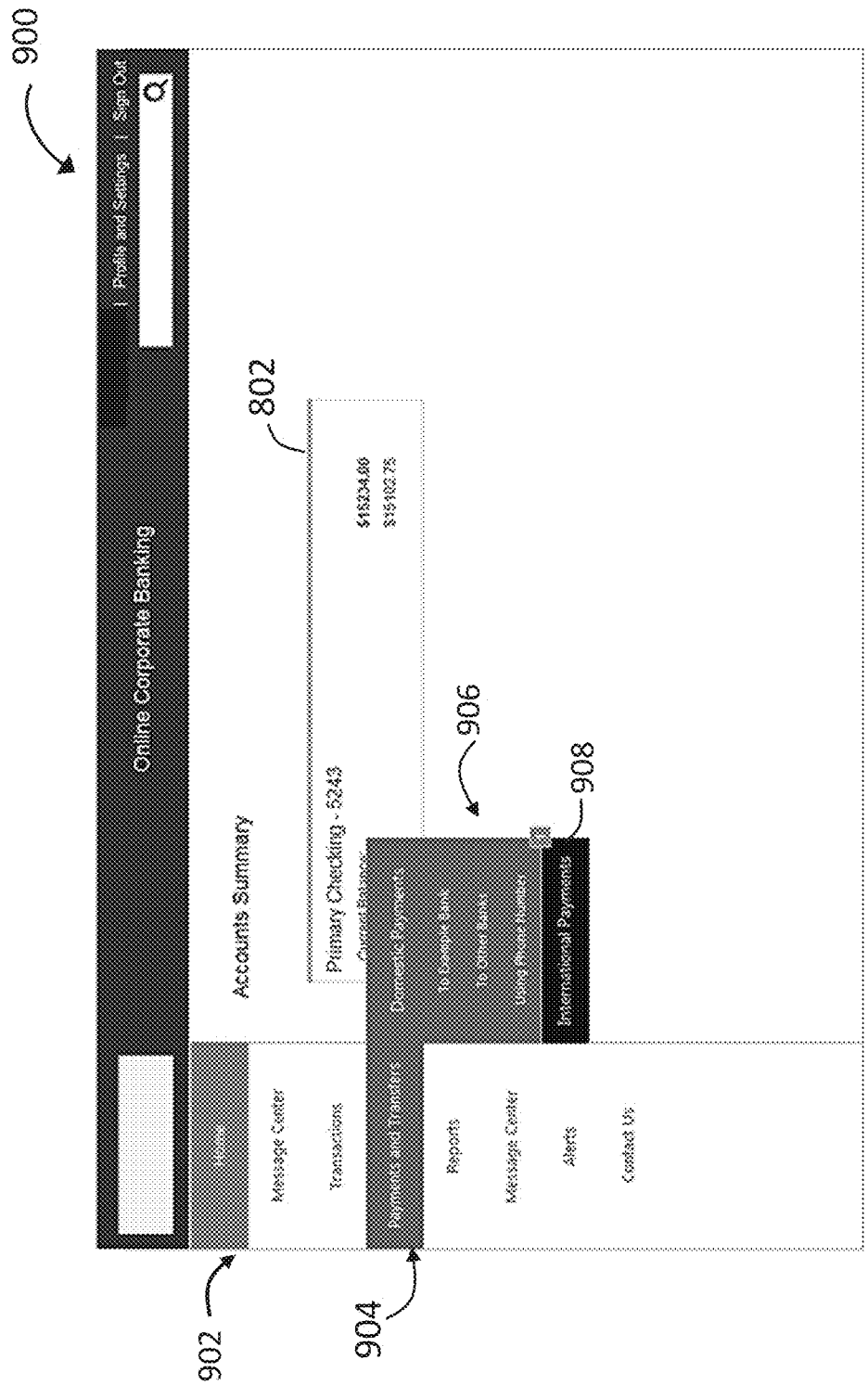

FIG. 9 is a second example screenshot displayed on a user interface (e.g., client computing device 402, shown in FIG. 4) associated with sender 104 (shown in FIG. 1) displaying an example user interface 900 for initiating a data rich cross border payment through sender's 104 financial institution (e.g., originating bank 108, shown in FIG. 1) using CBP computing device 102, as described above. User interface 900 may be hosted by originating bank 108, or otherwise made accessible to a user, such as sender 104 and recipient 106 (shown in FIG. 1) by CBP computing device 102.

User interface 900 provides a login page displaying sender's 104 financial accounts summary 802, as shown in user interface 800. User interface 900 includes a menu 902 of selectable options that includes a "payments and transfers" option 904. In the example embodiment, sender 104 selects "payments and transfers" option 904 to populate a dropdown menu 906 of selections that enables sender 104 to transmit domestic and international payments. Dropdown menu 906 includes an international payments tab 908. Sender 104 may initiate a cross border data rich payment transfer in real-time by selecting international payments tab 908 from dropdown menu 906.

Figure 10:
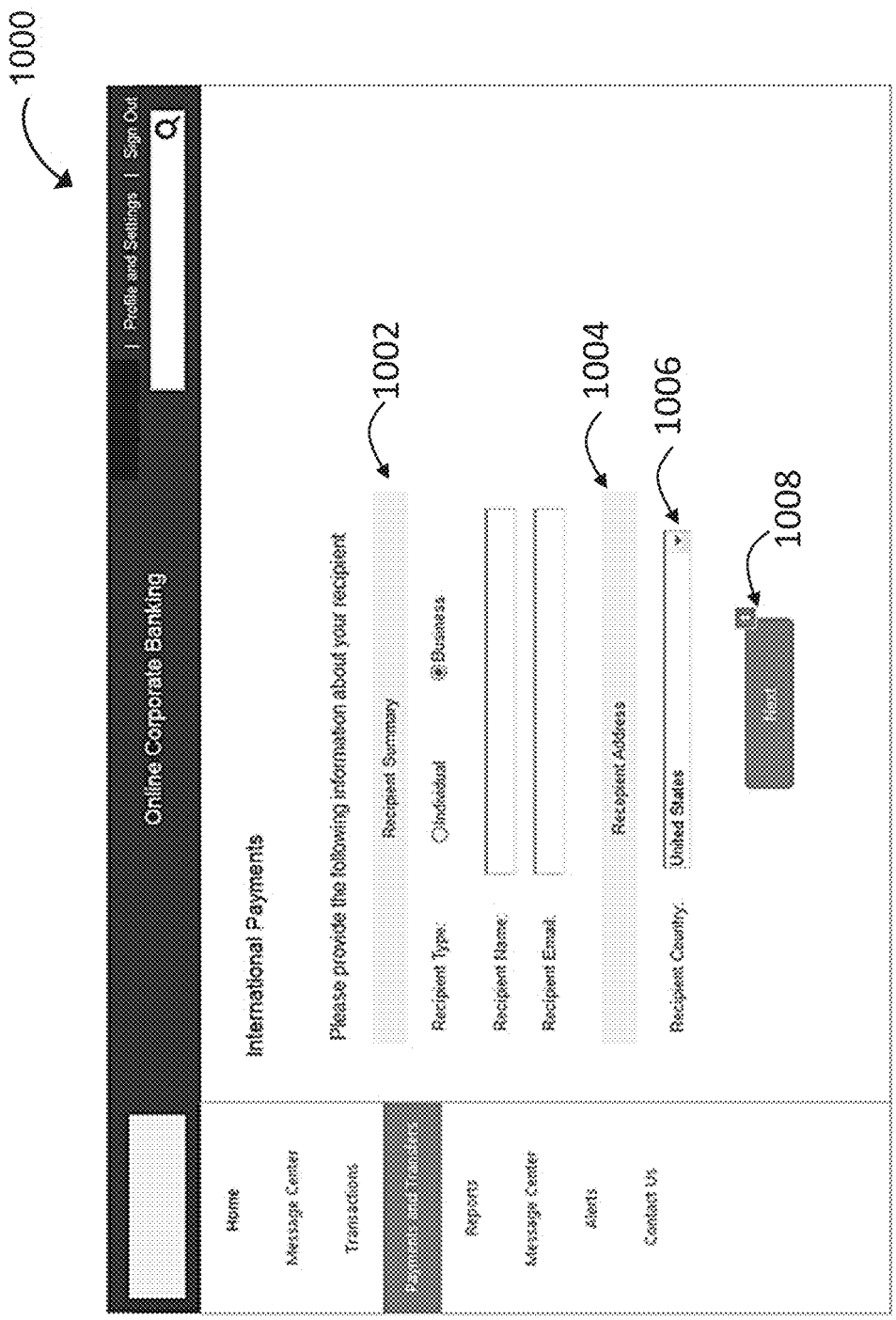

FIG. 10 is a third example screenshot displayed on a user interface (e.g., client computing device 402, shown in FIG. 4) associated with sender 104 (shown in FIG. 1) displaying an example user interface 1000 for transmitting real-time international payments through sender's 104 financial institution (e.g., originating bank 108, shown in FIG. 1) using CBP computing device 102 (shown in FIG. 1), as described above. User interface 1000 may be hosted by CBP computing device 102 or otherwise made accessible to a user, such as sender 104 and recipient 106 (shown in FIG. 1) by originating bank 108.

In the example embodiment, user interface 1000 is displayed to after sender 104 selects international payments tab 908 from dropdown menu 906 (both shown in FIG. 9). User interface 1000 includes a recipient summary section 1002 and a recipient address section 1004. User interface 1000 enables sender 104 to input information associated with recipient 106 at recipient summary section 1002 and recipient address section 1004. Recipient summary section 1002 may prompt sender 104 to input specific information regarding recipient 106, including a recipient type (e.g., an individual or a business), a recipient name, and/or a recipient email address. Recipient address 1004 may include a recipient country dropdown menu 1006 that enables sender 104 to select, from a list of countries, the country in which recipient 106 is located. After verifying the information provided, sender 104 may select button 1008 to continue with the international payment process.

Figure 11:
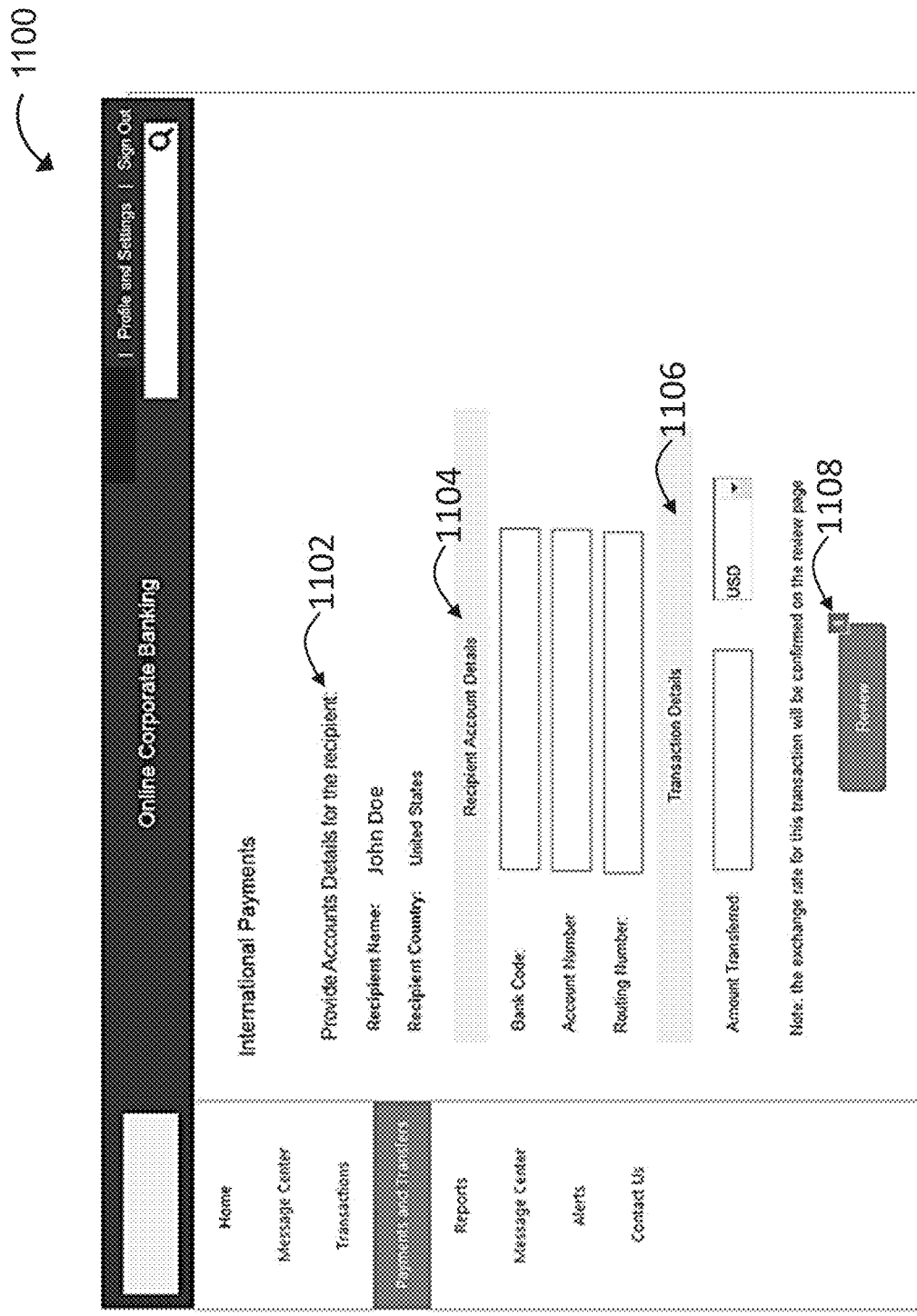

FIG. 11 is a fourth example screenshot displayed on a user interface (e.g., client computing device 402, shown in FIG. 4) associated with sender 104 (shown in FIG. 1) displaying an example user interface 1100 for transmitting real-time international payments through sender's 104 financial institution (e.g., originating bank 108, shown in FIG. 1) using CBP computing device 102 (shown in FIG. 1), as described above. User interface 1100 may be hosted by CBP computing device 102 or otherwise made accessible to a user, such as sender 104 and recipient 106 (shown in FIG. 1) by originating bank 108.

In the example embodiment, user interface 1100 provides a recipient summary 1102 of the recipient information provided by sender 104 on user interface 1000 (shown in FIG. 10). Recipient summary 1102 enables sender 104 to verify that recipient's 106 name and country are correct. User interface 1100 further provides a recipient account details section 1104 and a transaction details section 1106. Recipient account details section 1104 enables sender 104 to input banking information associated with recipient, including, for example, a bank code, an account number, and a routing number. Transaction details section 1106 enables sender 104 to input transaction information including the transfer amount (e.g., amount to be transferred to recipient 106) as well as the corresponding currency (e.g., USD) of the transfer amount. After providing all the requisite information in recipient account details section 1004 and transaction details section 1106, sender 104 may select a review button 1108 to continue with the international payment process.

Figure 12:
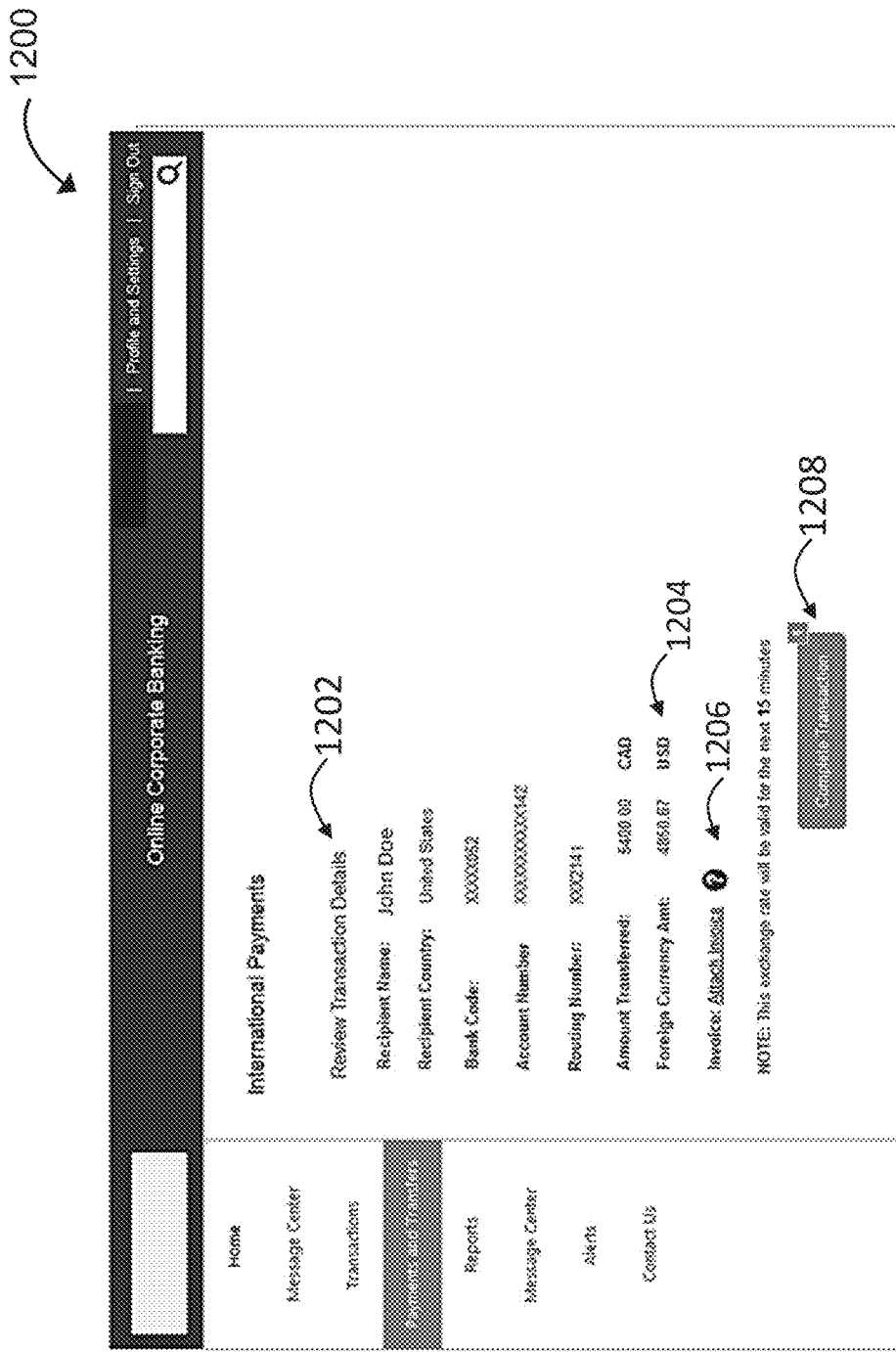

FIG. 12 is a fifth example screenshot displayed on a user interface (e.g., client computing device 402, shown in FIG. 4) associated with sender 104 (shown in FIG. 1) displaying an example user interface 1200 for transmitting real-time international payments through sender's 104 financial institution (e.g., originating bank 108, shown in FIG. 1) using CBP computing device 102 (shown in FIG. 1), as described above. User interface 1200 may be hosted by CBP computing device 102 or otherwise made accessible to a user, such as sender 104 and recipient 106 (shown in FIG. 1) by originating bank 108.

In the example embodiment, user interface 1200 provides a summary 1202 of the transaction details provided for recipient 106. User interface 1200 enables sender 104 to review the recipient 106 information and funds transfer transaction information, including the transfer amount. In the example embodiment, user interface 1200 displays all the information entered by sender 104, including recipient's 106 bank code, account number, routing number, and transfer amount. In particular, user interface 1200 includes a foreign currency amount 1204 that corresponds to the transfer amount (e.g., amount to be transferred). Foreign currency amount 1204 displays the transfer amount in the currency that is to be received by recipient 106. Further, user interface 1200 also includes an invoice option 1206 that enables sender 104 to attach an invoice or a bill payment stub to accompany a payment being made to recipient 106. In other embodiments, user interface 1200 includes a text box that enables sender 104 to transmit a message to recipient 106. After reviewing the information on user interface 1200, sender 104 may select a "complete transaction" button 1208 to proceed with the international payment process.

Figure 13:
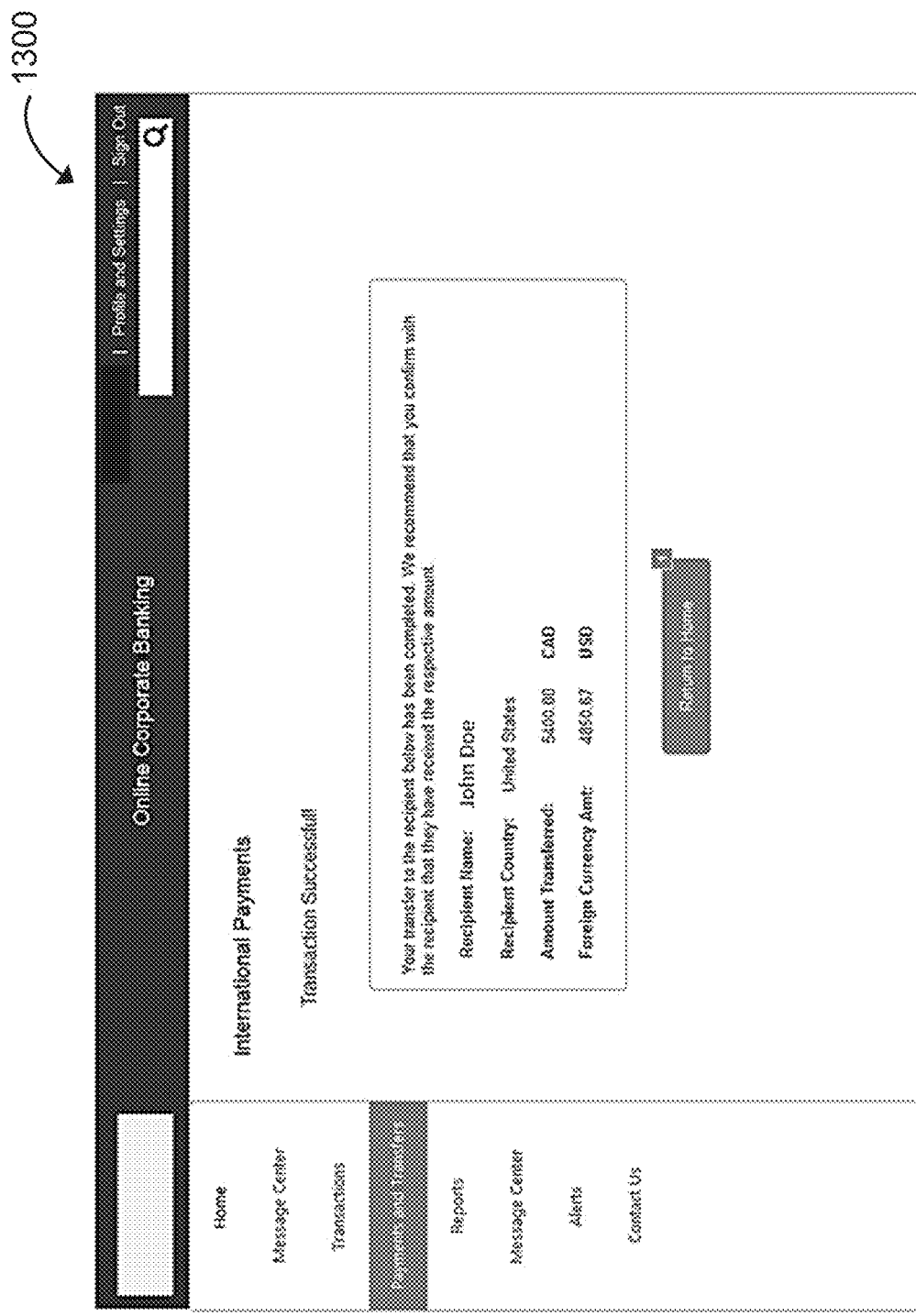

FIG. 13 is a sixth example screenshot displayed on a user interface (e.g., client computing device 402, shown in FIG. 4) associated with sender 104 (shown in FIG. 1) displaying an example user interface 1300 for transmitting real-time international payments through sender's 104 financial institution (e.g., originating bank 108, shown in FIG. 1) using CBP computing device 102 (shown in FIG. 1), as described above. User interface 1300 may be hosted by CBP computing device 102 or otherwise made accessible to a user, such as sender 104 and recipient 106 (shown in FIG. 1) by originating bank 108. In the example embodiment, user interface 1300 is a confirmation page, acknowledging that the cross border funds transfer transaction was successful. User interface 1300 may display a receipt/confirmation message (e.g., confirmation details) including, for example, recipient's 106 name, country, transfer amount, and foreign currency amount 1204 (shown in FIG. 12).

Figure 14:
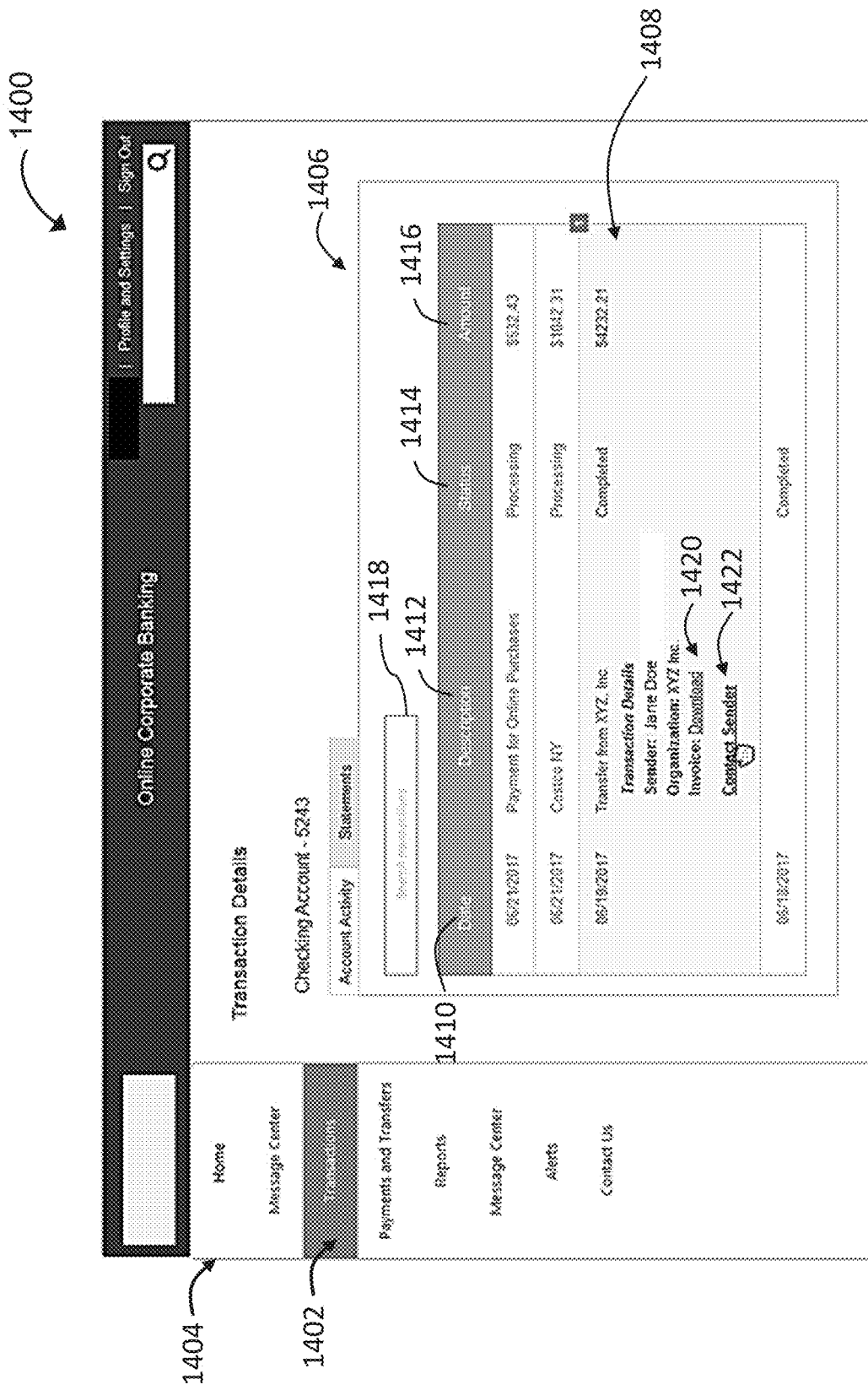

FIG. 14 is an example screenshot displayed on a user interface (e.g., client computing device 402, shown in FIG. 4) associated with recipient 106 (shown in FIG. 1) displaying an example user interface 1400 for confirming receipt of the real-time international payment sent by sender's 104 financial institution (e.g., originating bank 108, shown in FIG. 1) to recipient's 106 financial institution (e.g., receiving bank 112, shown in FIG. 1) using CBP computing device 102 (shown in FIG. 1), as described above. User interface 1400 may be hosted by CBP computing device 102 or otherwise made accessible to a user, such as recipient 106 by receiving bank 112.

In the example embodiment, a user, such as recipient 106 selects a transactions tab 1402 from a drop down menu 1404 (similar to menu 902, shown in FIG. 9) to access user interface 1400 from their banking app. User interface 1400 provides transaction details as to funds transfer activity for a financial account associated with recipient 106, such as recipient financial account 114 (shown in FIG. 1). Transaction details are provided in an account activity section 1406 where transaction activity for transactions, such as an example funds transfer transaction 1408, is displayed in a table format. The table may include a date column 1410, an activity description column 1412, a status column 1414 (e.g., processing, completed), and an amount column 1416 (e.g., transaction amount). User interface 1400 includes a search field 1418 to enable recipient 106 to search for specific transactions. Transaction details, for example funds transfer transaction 1408, may include a download option 1420 that enables recipient 106 to download an invoice or a bill payment stub that was sent by sender 104 as part of example funds transfer transaction 1408. Transaction details for example funds transfer transaction 1408 may also include a "contact sender" option 1422 that enables recipient 106 to reach out and message sender 104.

Figure 15:
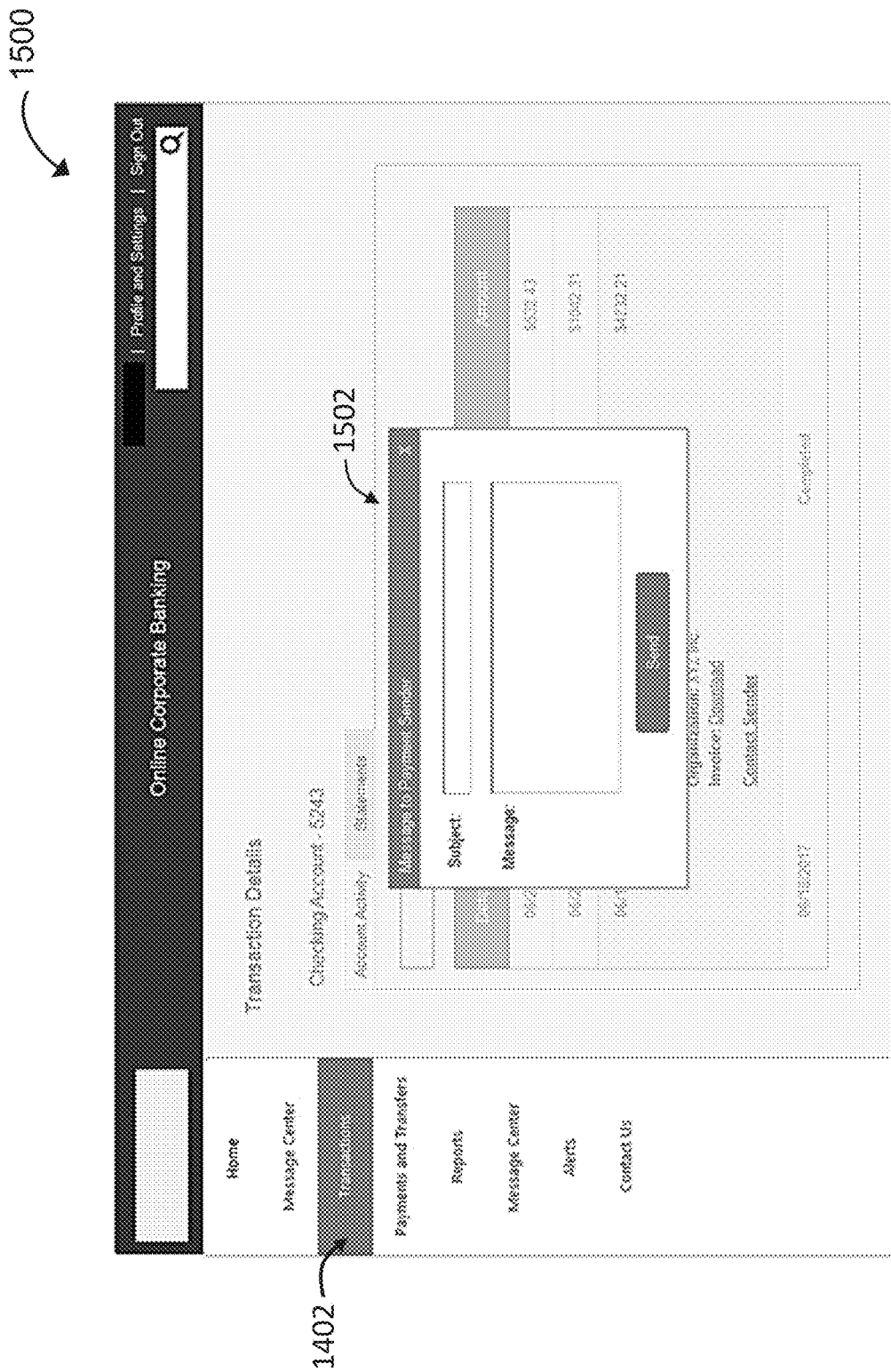

FIG. 15 is an example screenshot displayed on a user interface (e.g., client computing device 402, shown in FIG. 4) associated with recipient 106 (shown in FIG. 1) displaying an example user interface 1500 for messaging sender 104 in regards to an international payment received by recipient's 106 financial institution (e.g., receiving bank 112, shown in FIG. 1) from sender's 104 financial institution (e.g., originating bank 108, shown in FIG. 1) using CBP computing device 102 (shown in FIG. 1), as described above. User interface 1500 may be hosted by CBP computing device 102 or otherwise made accessible to a user, such as recipient 106 by receiving bank 112. In the example embodiment, recipient 106 accesses user interface 1500 after selecting "contact sender" option 1422 (shown in FIG. 14). User interface 1500 includes a message box 1502 that enables recipient 106 to send a message, including a subject line and a message body, to sender 104 using CBP computing device 102.

Although various elements of the computer system are described herein as including general processing and memory devices, it should be understood that the computer system is a specialized computer configured to perform the steps described herein for facilitating purchase transactions for items via interaction with a projected three-dimensional display.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cross border payment (CBP) computing device for transmitting cross border data rich payments in real-time from a payor associated with a first payment processing network of a plurality of payment processing networks to a payee associated with a second payment processing network of the plurality of payment processing networks, the CBP computing device in communication with both the first payment processing network and the second payment processing network, the CBP computing device comprising a processor communicatively coupled to a memory and a database, the database storing i) associations between each of the plurality of payment processing networks and a respective one of a plurality of sets of message formatting standards and protocols for electronic transfer of funds between financial institutions, and a plurality of translation rules for translating messages between the plurality of sets of message formatting standards and protocols, the processor configured to:
receive a payment request message to transfer funds in real-time from a payor account associated with the payor to a payee account associated with the payee, the payment request message received from an originating bank associated with the payor, the payment request message including payment instructions and transaction information associated with a transfer amount, the payment instructions including a payor identifier and a payee identifier;
identify the first payment processing network and the second payment processing network by parsing the received payment request message;
determine, based upon the identification, that the received payment request message is a cross border payment transfer from the identified first payment processing network for processing real-time payments within a first country to the identified second payment processing network for processing real-time payments within a second country, wherein the identified first payment processing network and the identified second payment processing network utilize different sets of message formatting standards and protocols;
identify, from the database, one of the sets of message formatting standards and protocols associated with the identified second payment processing network;
retrieve, from the translation rules in the database, at least one translation rule to apply to the received payment request message based on the identified set of message formatting standards and protocols associated with the identified second payment processing network;
reformat, by applying the at least one translation rule, the received payment request message to comply with the identified set of message formatting standards and protocols associated with the identified second payment processing network;
transmit, in real-time with respect to the receipt of the payment request message, the reformatted payment request message to a receiving bank associated with the payee to cause the receiving bank to automatically disburse the funds equal to the transfer amount into the payee account;
receive, from the receiving bank, a payment approval message confirming that the receiving bank has accepted the payment request message; and
instruct the receiving bank, in response to receiving the payment approval message, to automatically credit the payee account with the funds equal to the transfer amount.

2. The CBP computing device of claim 1, wherein the originating bank connects to the identified first payment processing network and the receiving bank connects to the identified second payment processing network using a payment platform.

3. The CBP computing device of claim 1, wherein the processor is further configured to transmit a funds transfer message to a partner bank through the identified second payment processing network, the funds transfer message including transfer instructions to automatically transmit the funds in the transfer amount from the partner bank to the receiving bank.

4. The CBP computing device of claim 1, wherein the processor is further configured to:
instruct the originating bank to transfer the funds in the transfer amount from the payor account into a settlement account associated with the CBP computing device, the settlement account associated with a partner bank in communication with the identified first payment processing network; and
transmit a funds transfer message to the partner bank through the identified first payment processing network, the funds transfer message including settlement instructions as to the funds in the transfer amount.

5. The CBP computing device of claim 1, wherein the transaction information includes remittance information associated with the payment request message, the remittance information including at least one of invoice data and payment terms between the payor and the payee.

6. The CBP computing device of claim 1, wherein the processor is further configured to:
receive, from the receiving bank, a payment confirmation message confirming that the funds equal to the transfer amount have successfully been credited to the payee account;
reformat the payment confirmation message to comply with one of the sets of message formatting standards and protocols associated with the identified first payment processing network; and
transmit the reformatted payment confirmation message to the originating bank.

7. The CBP computing device of claim 1, wherein the processor is further configured to enable the payor to use a proxy associated with the payee to transfer the funds to the payee by:
receiving, from the originating bank, the proxy as the payee identifier, the proxy being at least one of a phone number and an email address associated with the payee;
comparing the received proxy with a plurality of proxies stored in the database; and
identifying, based on the comparison, a financial account associated with the received proxy.

8. The CBP computing device of claim 1, wherein reformatting the received payment request message comprises modifying the payment request message to include data types and data field entries required by the identified set of message formatting standards and protocols associated with the identified second payment processing network.

9. The CBP computing device of claim 1, wherein reformatting the received payment request message comprises at least one of adding and removing a data field of the received payment request message to comply with the identified set of message formatting standards and protocols associated with the identified second payment processing network.

10. A computer-implemented method for transmitting cross border data rich payments in real-time from a payor of a first country to a payee of a second country, the method implemented using a cross border payment (CBP) computing device in communication with a first payment processing network of a plurality of payment processing networks, the first payment processing network associated with the first country and a second payment processing network of the plurality of payment processing networks, the second payment processing network associated with the second country, the CBP computing device comprising a processor communicatively coupled to a memory and a database, the database storing i) associations between each of the plurality of payment processing networks and a respective one of a plurality of sets of message formatting standards and protocols for electronic transfer of funds between financial institutions, and a plurality of translation rules for translating messages between the plurality of sets of message formatting standards and protocols, the method comprising:
   receiving, by the processor, a payment request message to transfer funds in real-time from a payor account associated with the payor to a payee account associated with the payee, the payment request message received from an originating bank associated with the payor, the payment request message including payment instructions and transaction information associated with a transfer amount, the payment instructions including a payor identifier and a payee identifier;
   identifying, by the processor, the first payment processing network and the second payment processing network by parsing the received payment request message;
   determining, by the processor and based upon the identification, that the received payment request message is a cross border payment transfer from the identified first payment processing network for processing real-time payments within the first country to the identified second payment processing network for processing real-time payments within the second country, wherein the identified first payment processing network and the identified second payment processing network utilize different sets of message formatting standards and protocols;
   identifying, by the processor from the database, one of the sets of message formatting standards and protocols associated with the identified second payment processing network;
   retrieving, by the processor from the translation rules in the database, at least one translation rule to apply to the received payment request message based on the identified set of message formatting standards and protocols associated with the identified second payment processing network;
   reformatting, by the processor and applying the at least one translation rule, the received payment request message to comply with the identified set of message formatting standards and protocols associated with the identified second payment processing network;
   transmitting, by the processor in real-time with respect to the receipt of the payment request message, the reformatted payment request message to a receiving bank associated with the payee to cause the receiving bank to automatically disburse the funds equal to the transfer amount into the payee account;
   receiving, by the processor from the receiving bank, a payment approval message confirming that the receiving bank has accepted the payment request message; and
   instructing, by the processor, the receiving bank, in response to receiving the payment approval message, to automatically credit the payee account with the funds equal to the transfer amount.

11. The computer-implemented method of claim 10, wherein reformatting the received payment request message comprises reformatting the received payment request message to comply with a global International Organization for Standardization (ISO) 20022 network messaging standards associated with the identified second payment processing network.

12. The computer-implemented method of claim 10, wherein the transaction information includes remittance information associated with the payment request message, the remittance information including at least one of invoice data and payment terms between the payor and the payee.

13. The computer-implemented method of claim 10 further comprising:
   receiving, by the processor from the receiving bank, a payment confirmation message confirming that the funds equal to the transfer amount have successfully been credited to the payee account;
   reformatting, by the processor, the payment confirmation message to comply with one of the sets of message formatting standards and protocols associated with the first payment processing network; and
   transmitting, by the processor, the reformatted payment confirmation message to the originating bank.

14. The computer-implemented method of claim 10 further comprising enabling the payor to use a proxy associated with the payee to transfer funds to the payee by:
   receiving, by the processor from the originating bank, the proxy as the payee identifier, the proxy being at least one of a phone number and an email address associated with the payee;
   comparing, by the processor, the received proxy with a plurality of proxies stored in the database; and
   identifying, by the processor based on the comparison, a financial account associated with the received proxy.

15. The computer-implemented method of claim 10 wherein reformatting the received payment request message comprises at least one of adding and removing a data field of the received payment request message to comply with the identified set of message formatting standards and protocols associated with the identified second payment processing network.

16. One or more non-transitory computer-readable storage media having computer-executable instructions embodied thereon for transmitting real-time cross border data rich payments from a payor of a first country to a payee of a second country, wherein when executed by a cross border payment (CBP) computing device in communication with a first payment processing network of a plurality of payment processing networks for processing real-time payments within the first country and a second payment processing network of the plurality of payment processing networks for processing real-time payments within the second country, the CBP computing device comprising a processor communicatively coupled to a memory and a database, the database storing i) associations between each of the plurality of payment processing networks and a respective one of a plurality of sets of message formatting standards and protocols for electronic transfer of funds between financial institutions, and a plurality of translation rules for translating messages between the plurality of sets of message formatting standards and protocols, the computer-executable instructions cause the processor to:

receive a payment request message to transfer funds in real-time from a payor account associated with the payor to a payee account associated with the payee, the payment request message received from an originating bank associated with the payor, the payment request message including payment instructions and transaction information associated with a transfer amount, the payment instructions including a payor identifier and a payee identifier;

identify the first payment processing network and the second payment processing network by parsing the received payment request message;

determine, based upon the identification, that the received payment request message is a cross border payment transfer from the identified first payment processing network for processing real-time payments within the first country to the identified second payment processing network for processing real-time payments within the second country, wherein the identified first payment processing network and the identified second payment processing network utilize different sets of message formatting standards and protocols;

identify, from the database, one of the sets of message formatting standards and protocols associated with the identified second payment processing network;

retrieve, from the translation rules in the database, at least one translation rule to apply to the received payment request message based on the identified set of message formatting standards and protocols associated with the identified second payment processing network;

reformat, by applying the at least one translation rule, the received payment request message to comply with the identified set of message formatting standards and protocols associated with the identified second payment processing network;

transmit, in real-time with respect to the receipt of the payment request message, the reformatted payment request message to a receiving bank associated with the payee to cause the receiving bank to automatically disburse the funds equal to the transfer amount into the payee account;

receive, from the receiving bank, a payment approval message confirming that the receiving bank has accepted the payment request message; and instruct the receiving bank, in response to receiving the payment approval message, to automatically credit the payee account with the funds equal to the transfer amount.

17. The computer-readable storage media of claim 16, wherein the computer-executable instructions further cause the processor to:

receive, from the receiving bank, a payment confirmation message confirming that the funds equal to the transfer amount have successfully been credited to the payee account;

reformat the payment confirmation message to comply with one of the sets of message formatting standards and protocols associated with the identified first payment processing network; and transmit the reformatted payment confirmation message to the originating bank.

\* \* \* \* \*